(12) United States Patent
Ebi

(10) Patent No.: US 11,902,486 B2
(45) Date of Patent: Feb. 13, 2024

(54) INFORMATION PROCESSING APPARATUS AND INFORMATION PROCESSING METHOD

(71) Applicant: SHARP KABUSHIKI KAISHA, Sakai (JP)

(72) Inventor: Yukari Ebi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/740,576

(22) Filed: May 10, 2022

(65) Prior Publication Data
US 2022/0377203 A1    Nov. 24, 2022

(30) Foreign Application Priority Data

May 19, 2021    (JP) ................................. 2021-084652

(51) Int. Cl.
*H04N 1/44* (2006.01)
*H04N 1/00* (2006.01)

(52) U.S. Cl.
CPC ......... *H04N 1/4406* (2013.01); *H04N 1/0097* (2013.01); *H04N 2201/0094* (2013.01)

(58) Field of Classification Search
CPC .. G03G 15/04; G03G 15/043; G03G 15/5041; G03G 15/553; G03G 15/556; G03G 2221/1892; G06F 16/22; G06F 11/1092; G06F 11/2058; G06F 11/2069; G06F 2211/1035; G06F 3/165; G06F 3/167; G06K 15/12; G06K 15/4025; G06K 15/4065; H04N 1/036; H04N 1/0097; H04N 1/4406; H04N 2201/0094

USPC ............................................... 358/1.15, 1.14
See application file for complete search history.

(56) References Cited

U.S. PATENT DOCUMENTS

| | | | | |
|---|---|---|---|---|
| 6,944,412 | B2 * | 9/2005 | Mishima | G03G 15/502 358/1.9 |
| 7,778,851 | B2 * | 8/2010 | Schoenberg | G16H 15/00 600/300 |
| 11,550,524 | B1 * | 1/2023 | Hamada | G06F 3/1273 |
| 11,614,909 | B2 * | 3/2023 | Konishi | G06F 3/1255 358/1.15 |
| 11,647,145 | B2 * | 5/2023 | Ogawa | H04N 1/4446 358/1.14 |
| 2003/0164970 | A1 * | 9/2003 | Inui | H04N 1/32561 358/1.16 |
| 2008/0204807 | A1 * | 8/2008 | Nakatsuka | G06F 3/1273 358/1.16 |
| 2009/0009800 | A1 * | 1/2009 | Jung | G06K 15/02 358/1.15 |
| 2009/0094254 | A1 * | 4/2009 | Akita | H04N 1/00514 |
| 2010/0128309 | A1 | 5/2010 | Matoba | |
| 2010/0265530 | A1 * | 10/2010 | Takechi | G06F 3/1239 358/1.14 |

(Continued)

FOREIGN PATENT DOCUMENTS

JP    2010-130245 A    6/2010

*Primary Examiner* — Negussie Worku
(74) *Attorney, Agent, or Firm* — ScienBiziP, P.C.

(57) ABSTRACT

An information processing apparatus includes a storage and a controller. The storage stores history information pertaining to job execution, and when the history information is read from the storage and the history information includes restricted information, the controller restricts display of the restricted information.

6 Claims, 21 Drawing Sheets

(56) References Cited

U.S. PATENT DOCUMENTS

| | | | |
|---|---|---|---|
| 2011/0090533 A1* | 4/2011 | Shimizu | G06K 15/18 |
| | | | 358/1.15 |
| 2013/0004195 A1* | 1/2013 | Kohda | G06F 3/1259 |
| | | | 399/82 |
| 2016/0179443 A1* | 6/2016 | Saito | G06F 3/1285 |
| | | | 358/1.14 |
| 2017/0371286 A1* | 12/2017 | Takahashi | G03G 15/04 |
| 2020/0209933 A1* | 7/2020 | Shimamura | G06F 1/263 |
| 2020/0265126 A1* | 8/2020 | Matsuda | G06F 3/1285 |
| 2022/0232143 A1* | 7/2022 | Ogawa | H04N 1/00408 |
| 2022/0350555 A1* | 11/2022 | Okada | H04N 1/00832 |
| 2023/0171354 A1* | 6/2023 | Koujiro | H04N 1/00482 |
| | | | 358/1.16 |

* cited by examiner

FIG. 3

SETTING HISTORY INFORMATION

| JOB ID | JOB TYPE | EXECUTION USER NAME | START DATE – END DATE | MODE | SETTING VALUES |
|---|---|---|---|---|---|
| 025 | IMAGE TRANSMISSION | User1 | 2019/12/04 10:30:50 – 2019/12/04 10:32:50 | NORMAL | TO: aaaa@sample.com<br>COLOR MODE: AUTO/BLACK AND WHITE BINARY<br>RESOLUTION: 200dpix200dpi<br>FORMAT: PDF<br>DOCUMENT: SINGLE-SIDED TO SINGLE-SIDED<br>DENSITY: AUTOMATIC<br>DEFAULT SUBJECT: -<br>REGISTERED SUBJECT: -<br>REGISTERED BODY: -<br>REGISTERED FILE NAME: -<br>SUBJECT: NOTE FOR MR. AAA |
| 024 | IMAGE TRANSMISSION | User2 | 2019/12/04 10:15:30 – 2019/12/04 10:17:50 | NORMAL | TO: bbbb@sample.com, cccc@sample.com<br>COLOR MODE: FULL COLOR<br>RESOLUTION: 300dpix300dpi<br>FORMAT: JPEG<br>DOCUMENT: SINGLE-SIDED TO SINGLE-SIDED<br>DENSITY: AUTOMATIC<br>DEFAULT SUBJECT: DEFAULT_1<br>REGISTERED SUBJECT: -<br>REGISTERED BODY: BODY_2 (DIRECT INPUT)<br>REGISTERED FILE NAME: - |
| 023 | IMAGE TRANSMISSION | User3 | 2019/12/04 09:30:00 – 2019/12/04 09:31:10 | NORMAL | TO: dddd@sample.com<br>COLOR MODE: FULL COLOR<br>RESOLUTION: 600dpix600dpi<br>FORMAT: JPEG<br>DOCUMENT: SINGLE-SIDED TO SINGLE-SIDED<br>DENSITY: AUTOMATIC<br>DEFAULT SUBJECT: -<br>DEFAULT SUBJECT: SUBJECT_1<br>REGISTERED BODY: -<br>REGISTERED FILE NAME: FILE_1 |
| 022 | COPY | User4 | 2019/12/04 09:10:10 – 2019/12/04 09:10:50 | NORMAL | NUMBER OF COPIES: 1<br>COLOR MODE: FULL COLOR<br>DOCUMENT: AUTOMATIC<br>PAPER SELECTION: No.1<br>DOUBLE-SIDED COPY: SINGLE-SIDED TO SINGLE-SIDED<br>MAGNIFICATION: 100%<br>DENSITY: AUTOMATIC<br>STAMP: TYPE_1 |
| 021 | FAX | User5 | 2019/12/04 09:05:00 – 2019/12/04 09:06:10 | NORMAL | TO: 0123456789<br>DENSITY: AUTOMATIC<br>IMAGE QUALITY: NORMAL CHARACTERS<br>MASS DOCUMENT MODE: NO<br>THIN PAPER READING: NO<br>THICK PAPER READING: NO<br>DESTINATION REDISPLAY: YES |

FIG. 4A

| TARGET ITEM | TARGET ITEM VALUE | | |
|---|---|---|---|
| DEFAULT SUBJECT | DEFAULT_1 | DEFAULT_2 | DEFAULT_3 |
| REGISTERED SUBJECT | SUBJECT_1 | SUBJECT_2 | SUBJECT_3 |
| REGISTERED BODY | BODY_1 | BODY_2 | BODY_3 |
| REGISTERED FILE NAME | FILE_1 | FILE_2 | FILE_3 |

FIG. 4B

| |
|---|
| DEFAULT SUBJECT |
|     DEFAULT_1: "REGARDING AAA"<br>    DEFAULT_2: "REGARDING BBB"<br>    DEFAULT_3: "REGARDING CCC" |
| REGISTERED SUBJECT |
|     SUBJECT_1: "SENDING MINUTES"<br>    SUBJECT_2: "SENDING MEETING MATERIALS"<br>    SUBJECT_3: "SENDING MONTHLY REPORT" |
| REGISTERED BODY |
|     BODY_1: "MINUTES ATTACHED"<br>    BODY_2: "MEETING MATERIALS ATTACHED"<br>    BODY_3: "MONTHLY REPORT ATTACHED" |
| REGISTERED FILE NAME |
|     FILE_1: "file_001"<br>    FILE_2: "file_002"<br>    FILE_3: "file_003" |

| STAMP | TYPE_1 | TYPE_2 | TYPE_3 |
|---|---|---|---|
| CONTENT | TOP SECRET | COPY STRICTLY PROHIBITED | CONFIDENTIAL |

INFORMATION PROCESSING APPARATUS AND INFORMATION PROCESSING METHOD

BACKGROUND OF THE INVENTION

Field of the Invention

The present disclosure relates to an information processing apparatus or the like.

Description of the Background Art

Some information processing apparatuses, such as multifunction peripherals, store history information including setting values pertaining to job execution (hereinafter referred to as "setting history information") in a readable manner.

A user can read and reuse desired setting history information when executing a new job, or change the setting values as necessary, thereby reducing the burden of time and effort involved in executing the new job.

From the perspective of effective use of the setting history information, when a new job is executed with the use of the setting history information, it is preferable to display a setting screen on which the setting content at the time of execution of the setting history information is reflected as it is. As a prior art fulfilling such a requirement, for example, such an image forming apparatus is known which manages a job setting screen and job history information, and displays a setting screen on which the setting content included in the job history information is reflected, when displaying a setting screen of a new job that uses the job history.

In conventional techniques, the setting content at the time of job execution is reflected and displayed in the setting screen of a new job as it is. Therefore, for example, even if the setting history information at the time of job execution includes personal information or an operation or the like that is treated as confidential for the job, this information is disclosed to the user executing the new job, which is undesirable from a security perspective.

An object of the present disclosure is to provide an information processing apparatus or the like that can achieve high security while maintaining the convenience of reusing the setting history information pertaining to the execution of a new job.

SUMMARY OF THE INVENTION

In order to solve the above issue, an information processing apparatus according to the present disclosure includes a storage, and a controller. The storage stores history information pertaining to job execution. When the history information is read from the storage and the history information includes restricted information, the controller restricts display of the restricted information.

Further, an information processing method according to the present disclosure includes storing history information pertaining to job execution in a storage device, and when the history information is read from the storage device and the history information includes restricted information, restricting display of the restricted information.

According to the present disclosure, it is possible to provide an information processing apparatus or the like that can achieve high security while maintaining the convenience of reusing the setting history information pertaining to the execution of a new job.

BRIEF DESCRIPTION OF THE DRAWINGS

FIG. 3 is a table illustrating an example of a configuration of setting history information.

FIGS. 4A and 4B are tables illustrating target items and their values.

DESCRIPTION OF THE PREFERRED EMBODIMENTS

Embodiments of the present disclosure will be described below with reference to the drawings. In the present disclosure, a multifunction peripheral that executes each function such as image transmission, faxing, and copying on a job-by-job basis is described as an embodiment of an information processing apparatus. The following embodiments are examples for explaining the present disclosure, and the technical scope of the description set forth in the claims is not limited to the following description.

1 First Embodiment

A first embodiment is a multifunction peripheral that stores, for a job execution, setting history information including setting values pertaining to the job execution in a readable manner, and in reading the setting history information, restricts the display of restricted information when the setting history information includes the restricted information.

1.1 Functional Configuration

Figure 1:
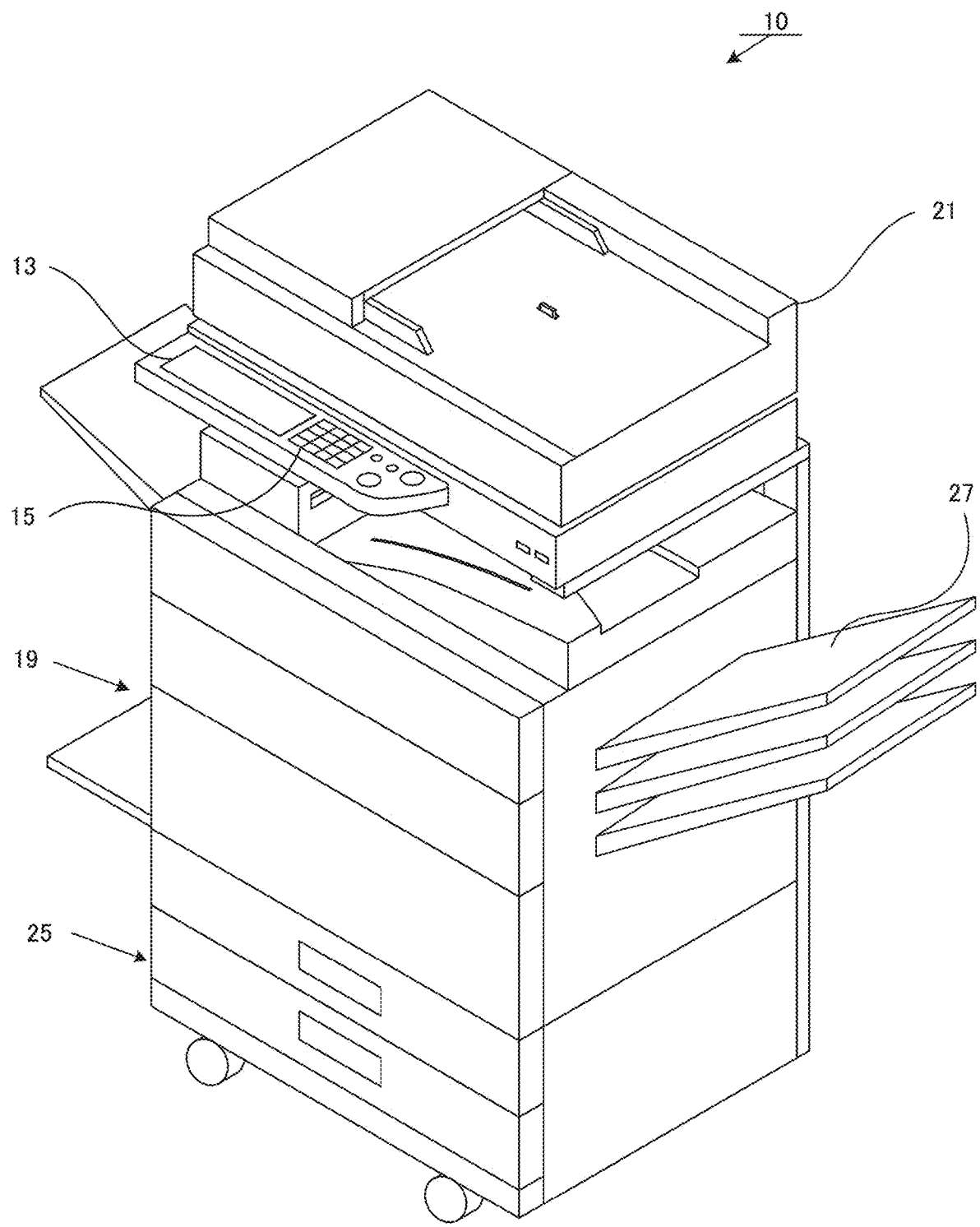
FIG. 1 is an external perspective view for explaining an overall configuration of a multifunction peripheral according to a first embodiment.
Figure 2:
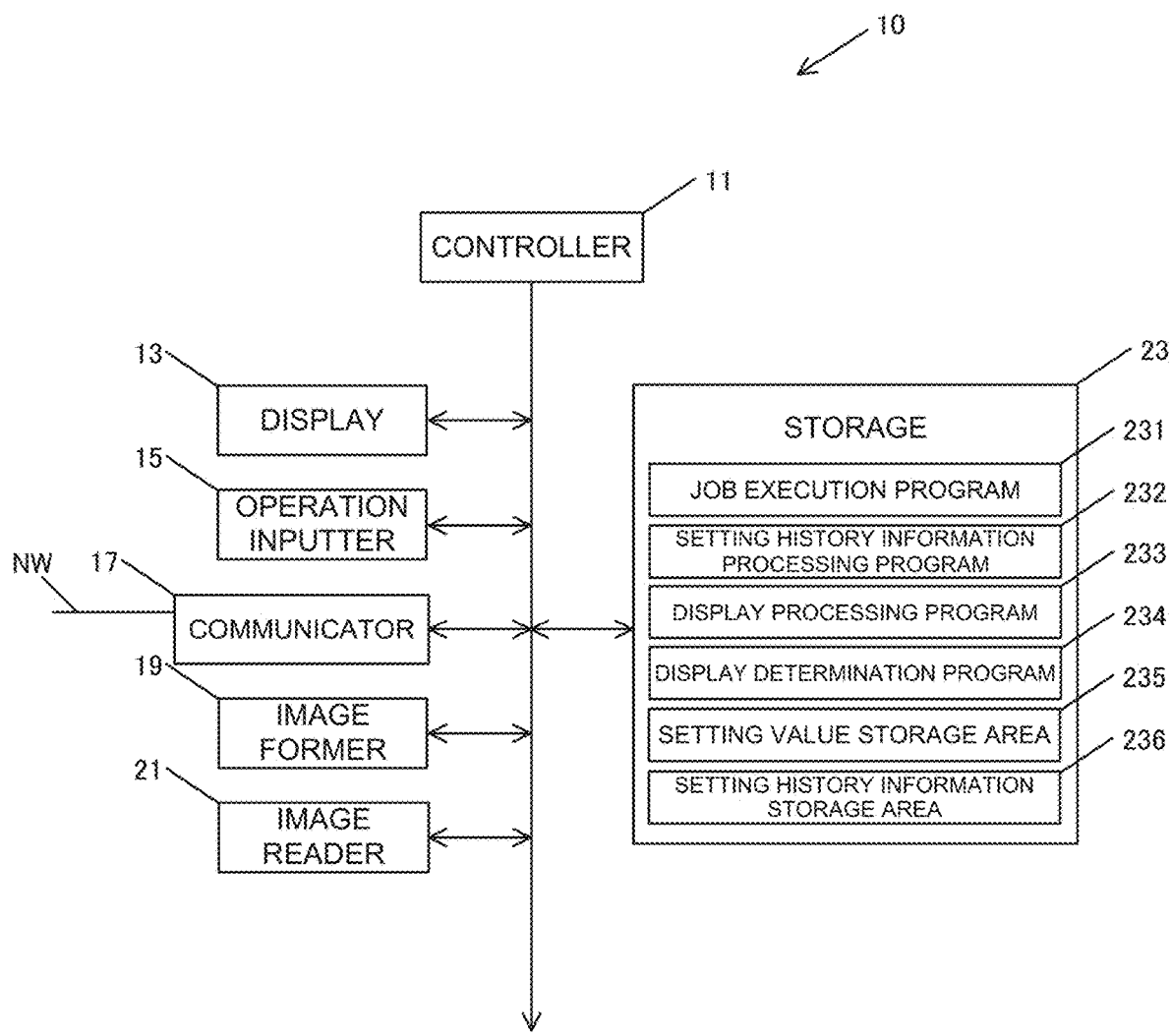
FIG. 2 is a diagram illustrating a functional configuration of the multifunction peripheral according to the first embodiment.

FIG. 1 is an external perspective view schematically illustrating an overall configuration of a multifunction peripheral 10 according to the first embodiment. FIG. 2 is a functional configuration diagram of a multifunction peripheral 10. The multifunction peripheral 10 includes a controller 11, a display 13, an operation inputter 15, a communicator 17, an image former 19, an image reader 21, and a storage 23.

The controller 11 controls the entire multifunction peripheral 10. The controller 11 is composed of one or more arithmetic devices (such as a central processing unit (CPU)). The controller 11 implements its functions by reading and executing various programs stored in the storage 23.

The display 13 displays various types of information to users or the like. The display 13 can be composed of, for example, a liquid crystal display (LCD) or an organic electro-luminescence (EL) display.

The operation inputter 15 accepts input information entered by users and others. The operation inputter 15 may include hardware keys (e.g., a numeric keypad), buttons, etc. The operation inputter 15 can be configured as a touch panel that allows input via the display 13. In this case, as an input method for the touch panel, a method such as a resistive film method, an infrared method, an electromagnetic induction method, or a capacitive sensing method may be employed.

The communicator 17 includes either a wired or wireless interface or both interfaces to communicate with other devices via a network (NW) such as a local area network (LAN), a wide area network (WAN), the Internet, a telephone line, and a fax line.

The image former 19 forms an image based on image data, on a paper as a recording medium. The image former 19 feeds a paper from a paper feeder 25, forms an image based on the image data on the paper, and then discharges the paper from a paper discharger 27. The image former 19 can be composed of, for example, a laser printer using an electrophotographic method. The image former 19 forms images using toner supplied from toner cartridges not illustrated corresponding to the toner colors (for example, cyan (C), magenta (M), yellow (Y), and black (K)).

The image reader 21 generates image data by scanning and reading a document image to be read. The image reader 21 can be configured as a scanner device with an image sensor such as a charge coupled device (CCD), a contact image sensor (CIS), or the like. There is no limitation on the configuration of the image reader 21 as long as the image reader 21 is configured to read the reflected light image from document image with an image sensor and thus generate image data.

The storage 23 stores various programs and data necessary for the operation of the multifunction peripheral 10. The storage 23 may be composed of a storage device including, for example, a random access memory (RAM), a hard disk drive (HDD), a solid state drive (SSD), a read only memory (ROM), or the like.

In the first embodiment, the storage 23 stores a job execution program 231, a setting history information processing program 232, a display processing program 233, and a display determination program 234, and secures a setting value storage area 235, a setting history information storage area 236.

The job execution program 231 is a program that is read by the controller 11 in order to perform processing associated with the execution of each function such as image transmission, fax, and copy. The controller 11 that has read the job execution program 231 executes a job by controlling the display 13, the operation inputter 15, the communicator 17, the image former 19, the image reader 21, and other parts involved in executing the job. Further, the controller 11 that has read the job execution program 231 executes various jobs on the basis of the setting values included in the setting history information.

The setting history information processing program 232 is a program that the controller 11 reads when, for example, acquisition of a setting value or the like pertaining to job execution, generation of setting history information, and various kinds of processing on the setting history information are to be performed. The controller 11 that has read the setting history information processing program 232 acquires the setting value pertaining to the job execution, and stores the acquired setting value in the setting value storage area 235. Further, the controller 11 generates the setting history information based on the acquired setting value, and stores the generated setting history information in the setting history information storage area 236.

The display processing program 233 is a program that is read by the controller 11 when displaying a display screen that displays the setting history information, a setting screen for accepting input of various setting values pertaining to the job execution, or a home screen that accepts switching of each job function, or the like. Further, the controller 11 that has read the display processing program 233 controls to restrict the display of restricted information when determining that the setting history information includes the restricted information.

The display determination program 234 is a program that is read by the controller 11 when determining whether the setting history information includes the restricted information. The controller 11 that has read the display determination program 234 determines whether the setting history information includes the restricted information when reading the setting history information accompanying the execution of a new job.

The setting value storage area 235 is a storage area for storing setting values pertaining to the execution of a job. The setting values include, for example, a color mode, a resolution, a format, a density, and the like set by the user or the device default values held by the device per se.

The setting history information storage area 236 is a storage area for storing the setting history information in the form of a data table or the like. The setting history information according to the present disclosure can be configured as history information in which an identifier such as a job ID for uniquely identifying information is attached to the information including a combination of information related to job execution history such as job type, execution user name, start date and time, mode, and the like, and part or all of the setting values stored in the setting value storage area 235. The setting history information stored in the setting history information storage area 236 is called as appropriate when executing a job, making display determinations, or the like based on the setting history information.

FIG. 3 is a diagram illustrating a configuration example of the setting history information. For example, the setting history information of job ID "025" includes, as information about an execution history, a job type "image transmission", an execution user name "User1", a start date and time-end date and time "2019/12/04 10:30:50-2019/12/04 10:32:50, and a mode "normal". Here, the mode is a value that indicates whether the job pertaining to the setting history information has been executed in a normal mode via a normal setting screen or a simple mode via a simple setting screen that is a simplified version of the normal setting screen.

If the destination of the image data or fax data is specified using the address book (not illustrated), transmission history, direct input, or the like, information about these destinations can be included as setting values in the setting history information. For example, the job ID "025" indicates an example in which the e-mail address of "aaaa@sample.com" is specified as the destination of the image data transmission.

Further, the setting history information pertaining to the job ID "025" includes setting values (target item values) as restricted information, such as a default subject, a registered subject, a registered body, and a registered file name, in addition to the device setting values pertaining to image transmission job, such as color mode "auto/black and white binary", resolution "200 dpi×200 dpi", format "PDF", document (reading surface) "single-sided to single-sided", and density "automatic".

In principle, the multifunction peripheral 10 according to the first embodiment restricts the display of restricted information when the setting history information includes the restricted information on security such as personal information. Here, the personal information means information on a living individual, which can be used to identify a specific individual. The information on an individual includes, for example, a name, a date of birth, a gender, an address, a telephone number, a place of work, an occupation (industry), a nationality, and a legal domicile. Further, for example, a passport number, personal identification information such as my number, and account and password information for accessing a specific site may also be included in security-related information.

The fixed phrase registered in the multifunction peripheral 10 is information that can be used and viewed by anyone, and it is not preferable that the fixed phrase is subject to unnecessary display restrictions. The multifunction peripheral 10 according to the first embodiment restricts the display of the fixed phrase when the user directly inputs or edits the fixed phrase. As a result, security can be ensured while ensuring convenience regarding the use and viewing of fixed phrases. In the first embodiment, restricted information such as a default subject, a registered subject, a registered body, and a registered file name is given as an example of target items pertaining to display determination, and when the content of the value of these target items (target item value) is directly input or edited by the user, the display of the restricted information is restricted.

For job ID "025", the default subject, registered subject, registered body, and registered file name that are target items are not used. However, the job ID "025" is an example that includes the personal information "Mr. AAA" as a setting value in the subject. In this case, since the subject includes restricted information on security such as personal information, the controller 11 restricts the display of the subject part.

Meanwhile, job ID "024" is an example in which a fixed phrase is used for the default subject and the registered body that are the target items. As illustrated in FIG. 3, "body_2" is used as a fixed phrase in the registered body, and the "body_2" is a value directly input by the user. Therefore, the controller 11 restricts the display of the registered body part. Specific examples of target item values are explained with reference to the next figure.

job ID "023" is an example in which a fixed phrase is used for the registered subject and the registered file name that are the target items. However, these registered subject and registered file name not directly input or edited by the user. Therefore, the controller 11 does not restrict the display of the registered subject part and the registered file name part, but displays them as they are.

FIG. 4A is a table illustrating the target item values (target setting values) according to the first embodiment. As mentioned above, in the first embodiment, the default subject, registered subject, registered body, and registered file name are the target items. The respective target items include the values of default subject: "default_1-3", registered subject: "subject_1-3", registered body: "body_1-3", and registered file name: "file_1-3".

FIG. 4B is a table illustrating an example of the specific content of the target item values. FIG. 4B indicates, for example, that the default subject which is one of the target items includes "default_1" as the target item value, and has the content of "Regarding AAA". Similarly, the "default_2" as the target item value has the content of "Regarding BBB", and the "default_3" as the target item value has the content of "Regarding CCC".

The controller 11 of the multifunction peripheral 10 according to the first embodiment restricts the display of the content of the target item values when the content of these target item values is directly input or edited by the user.

1.2 Processing Flow

Figure 5:
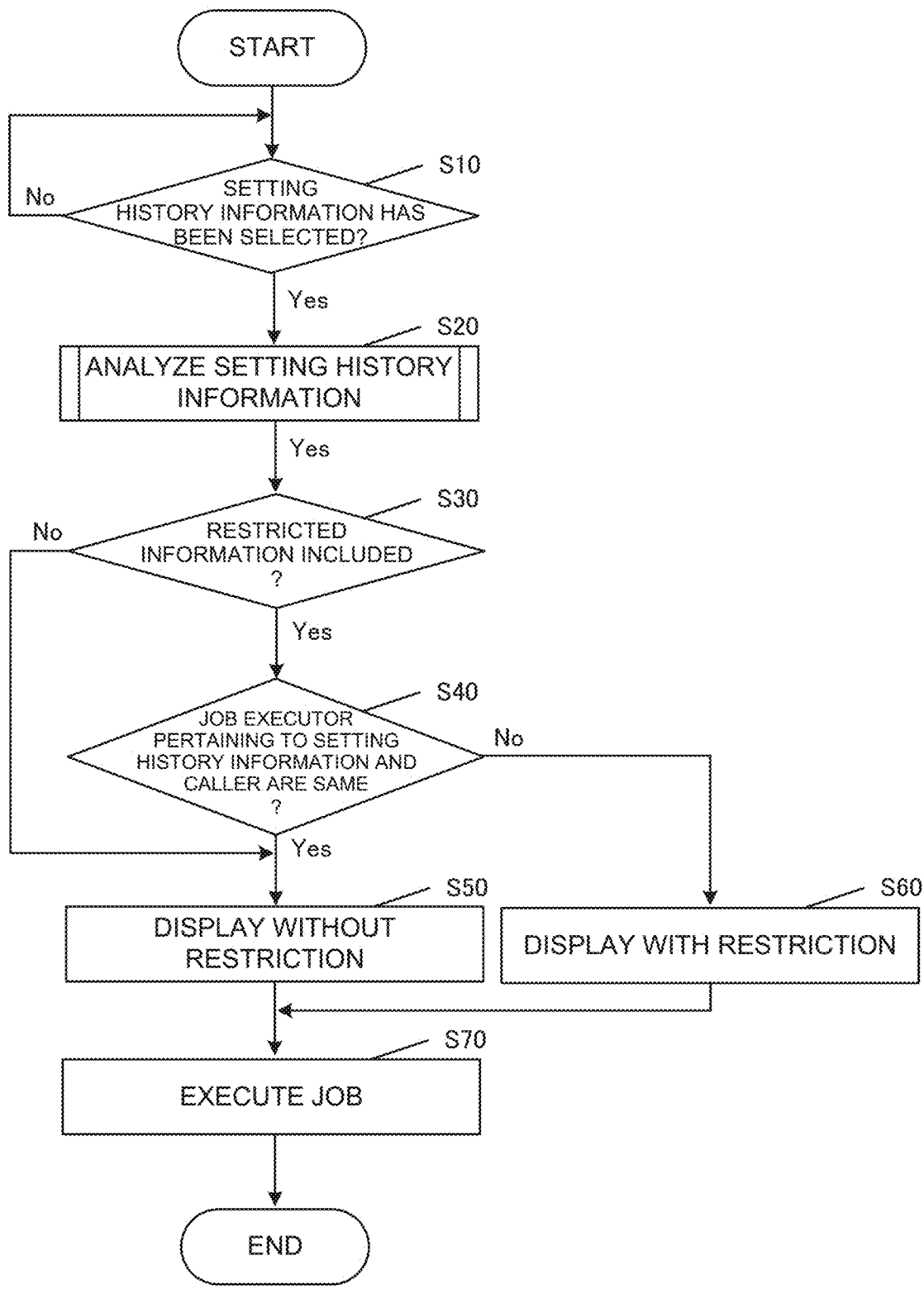
FIG. 5 is a flowchart illustrating a processing flow according to the first embodiment.

Next, a processing flow according to the first embodiment will be described. FIG. 5 is a flowchart illustrating processing by the multifunction peripheral 10. In the following description, for example, it is assumed that any job such as an image transmission job, a fax job, or a copy job is executed, and the setting history information pertaining to the job is stored in the setting history information storage area 236 in the manner illustrated in FIG. 3.

The controller 11 determines whether the setting history information has been selected by the user (step S10). The user can select desired setting history information from the setting history information displayed in the setting history display screen described below.

When the desired setting history information is selected by the user, the controller 11 reads the setting history information from the setting history information storage area 236 and analyzes the setting history information (if Yes in step S10, then step S20).

On the basis of the result of the analysis of the setting history information, the controller 11 determines whether the analyzed setting history information includes restricted information (step S30).

If determining that the setting history information includes restricted information, the controller 11 determines whether the job executor pertaining to the setting history information and the caller as the login user of the setting history information are the same (if Yes in step S30, then step S40).

If determining that the job executor pertaining to the setting history information and the caller of the setting history information are the same, the controller 11 displays the setting history information on the display 13 without restriction (if Yes in step S40, then step S50). Further, if determining that the setting history information does not include restricted information, the controller 11 displays the setting history information on the display 13 as it is without restriction (if No in step S30, then step S50).

If determining that the job executor pertaining to the setting history information and the caller of the setting history information are not the same, the controller 11 restricts the display of the portion pertaining to the restricted information and then displays the setting history information on the display 13 (if No in step S40, then step S60). It is also possible to configure so as to unconditionally restrict the display of the portion pertaining to the restricted information when the user authentication is disabled, or to unconditionally restrict the display of the portion pertaining to the restricted information, regardless of the identity of the job executor pertaining to the setting history information and the caller of the setting history information.

Upon receipt of an instruction to execute a job based on the setting history information displayed on the display 13, the controller 11 executes the job and ends the processing (step S70).

Next, the details of the processing in step S20 of FIG. 5 will be described using the flowchart of FIG. 6.

When starting to analyze the setting history information, the controller 11 scrutinizes the setting values included in the setting history information (step S2010).

The controller 11 determines whether the setting history information includes security-related information such as personal information as restricted information (step S2012). If determining that the setting history information includes security-related information, the controller 11 determines that the setting history information includes restricted information, and ends the processing (if Yes in step S2012, then step S2018).

If determining that the setting history information does not include security-related information as restricted information, the controller 11 compares a target item value and a setting value (if No in step S2012, then step S2014).

The controller 11 determines whether the setting value corresponding to the target item value is a different value (step S2016). If determining that the setting value corresponding to the target item value is a different value, the controller 11 determines that the setting history information includes restricted information, and ends the processing of Yes in step S2016, then step S2018).

If determining that the setting value corresponding to the target item value is the same value, the controller 11 determines whether the setting value has been directly input or has been edited by the user (step S2020). If determining that the setting value has been directly input or has been edited by the user, the controller 11 determines that the setting history information includes restricted information, and ends the processing of Yes in step S2020, then step S2018).

On the other hand, if determining that the setting value has not been directly input or has not been edited by the user, the controller 11 determines that the setting history information does not include restricted information and ends the processing (if No in step S2020, then step S2022).

1.3 Operation Example

Next, an operation example of the first embodiment will be described. In the present disclosure, a touch panel type operation inputter 15 provided on the screen of the display 13 detects the user's presses on each button area or the like divided on the screen, and enables each input by the user.

Figure 7:
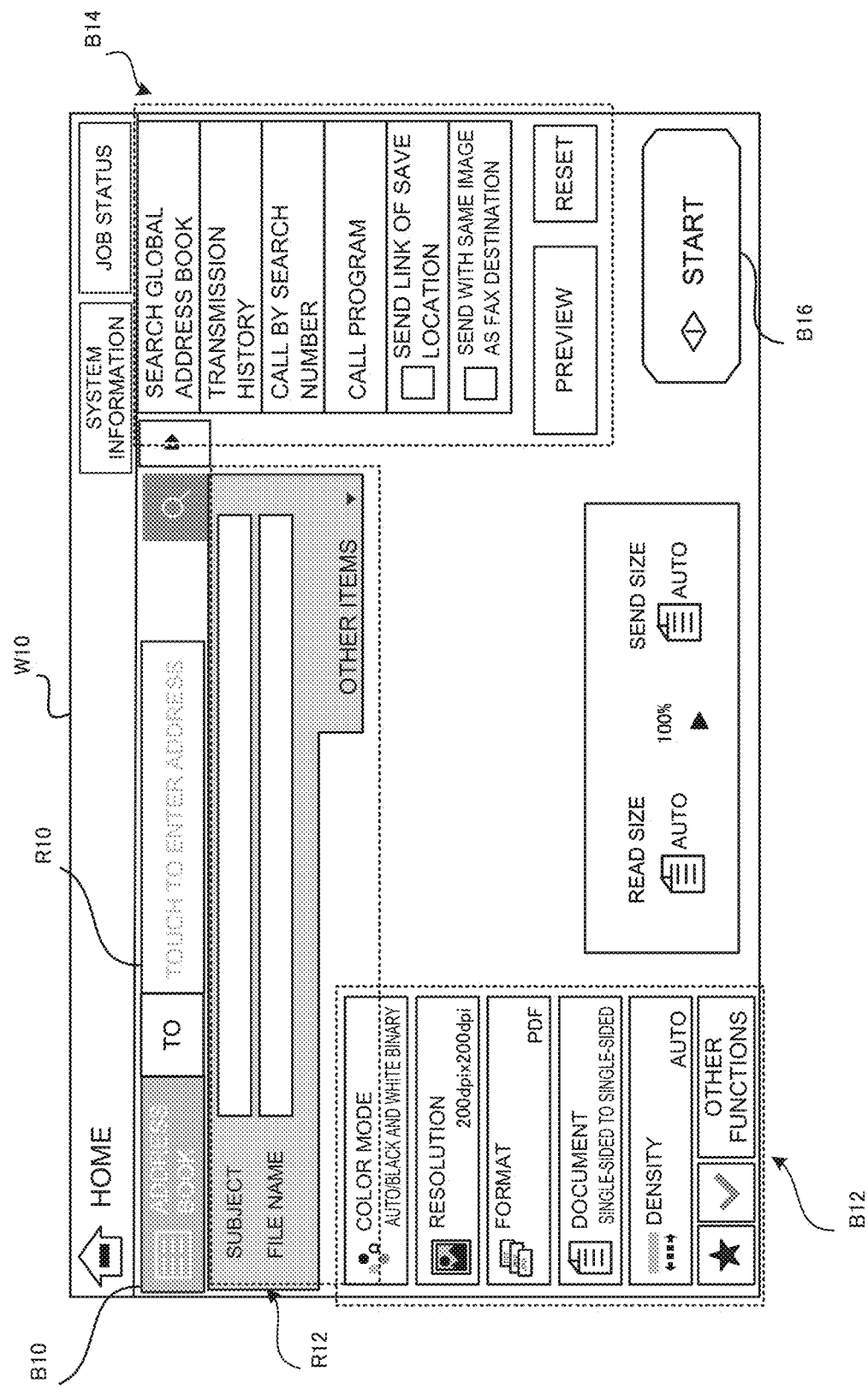
FIG. 7 is a diagram illustrating an operation example of the first embodiment.

FIG. 7 is a configuration example of the setting screen W10 pertaining to an image transmission job. The setting screen W10 can be displayed in mode selection processing or the like via a home screen (not illustrated). The setting screen W10 is a screen that accepts the selection and input of setting values pertaining to image transmission.

The setting screen W10 includes an address book button B10, setting value buttons B12, operation control buttons B14, a start button B16, a destination display area R10, and a subject and others display area R12.

The address book button B10 accepts a press when specifying a destination as the destination of the image data. When the address book button B10 is pressed, the controller 11 displays the address book (not illustrated). In this case, the controller 11 can display the address book managed inside the multifunction peripheral 10, or can display the address book acquired from an external terminal device, for example. The user can specify the destination of the image data by selecting a desired address (mail address, etc.) from the displayed address book. The controller 11 displays the specified address in the destination display area R10.

The setting value buttons B12 accept the selection and input of setting values by the user. The user can, for example, press the color mode button and select a desired setting value such as "full color", "black and white", "monochromatic color", and "automatic (color/black and white binary)" pertaining to color mode selection, thereby setting the setting value pertaining to the color mode. FIG. 7 is an exemplification in which respective setting value items of color mode, resolution, format, document (reading surface), and density are provided as the setting value items that can be set. On the surface of the setting value buttons B12, the value of each setting value of the applied setting history information is reflected and displayed (FIG. 7 is an example in which the setting value pertaining to the setting history information of the job ID "025" in FIG. 3 has been applied). The configuration of the setting value buttons B12 illustrated in FIG. 7 is only an example, and is not limited to the description in FIG. 7.

In addition to the above setting value items, the setting value buttons B12 provided with an "Other Function" button. The user can call up and set other setting value items other than those displayed on the setting value buttons B12 by pressing the "Other Function" button.

In addition to the "Preview" and "Reset" buttons, the operation control buttons B14 include a "Search Global Address Book" button, a "Transmission History" button, a "Call by Search Number" button, a "Call Program" button, a "Send Link of Save Location" button, a "Send with Same Image as Fax Destination" button, and the like. For example, the user can specify a destination from the global address book as the destination for transmitting image data by pressing the "Search Global Address Book" button.

The start button B16 accepts input of instructions for executing an image transmission job. When the start button B16 is pressed, the controller 11 executes the processing pertaining to the image transmission job.

The destination display area R10 is a display area where the destination of the image data input by selecting an address from the aforementioned address book, selecting an address from the global address book, selecting an address from the transmission history, or by direct input, or the like is displayed as the destination.

The subject and others display area R12 is a display area that displays the subject, file name, and the like pertaining to the transmission of image data. The subject and others display area R12 can mainly display information about the target item (subject, file name, body, etc.). By selecting "Other Items" in the subject and others display area R12, the body display area (not illustrated in FIG. 7) can be expanded.

Figure 8:
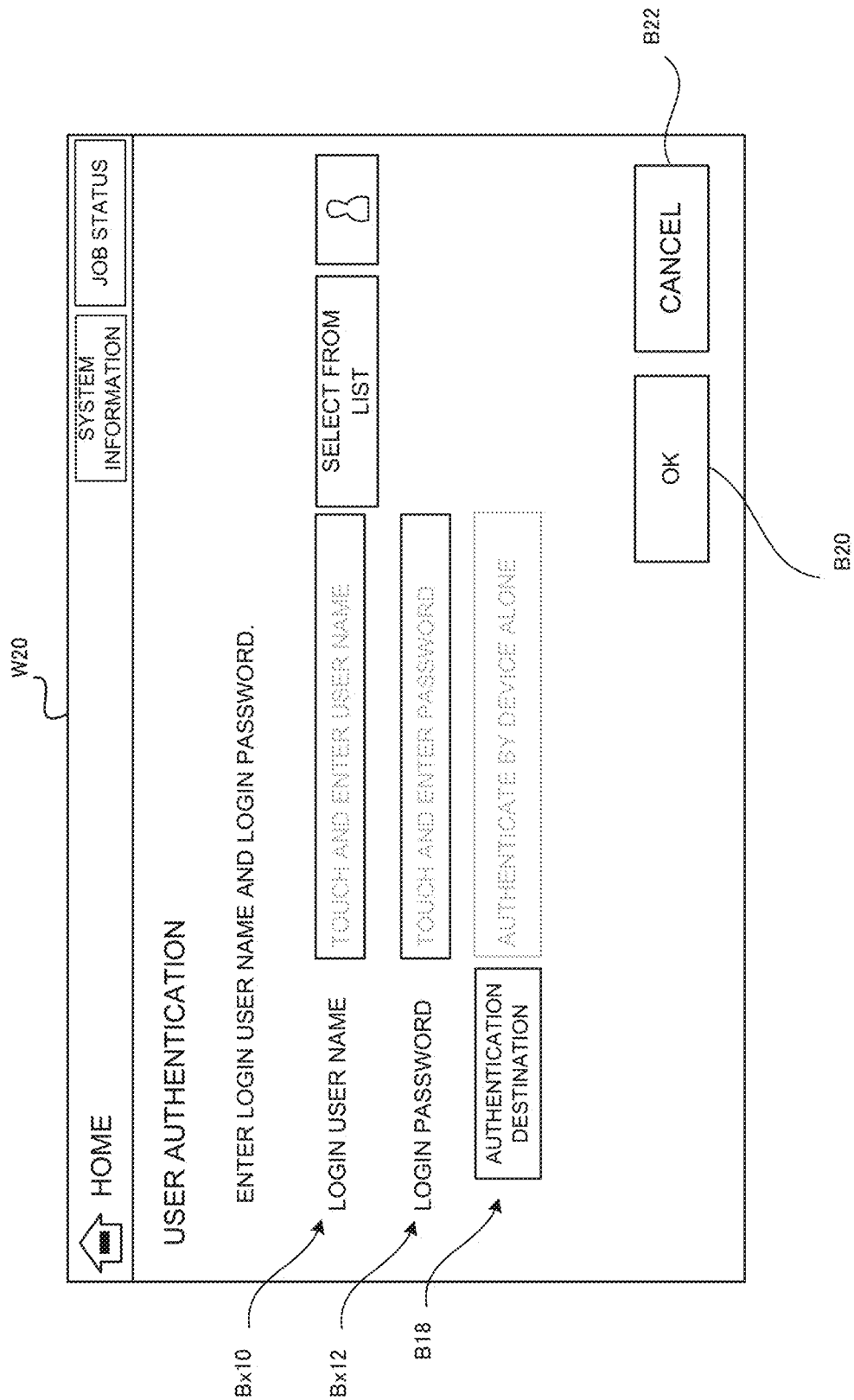
FIG. 8 is a diagram illustrating an operation example of the first embodiment.

FIG. 8 is a diagram illustrating a configuration example of the authentication screen W20 for performing user authentication. The user can log in to the multifunction peripheral 10 as a login user by performing user authentication via an authentication screen W20.

The user authentication screen W20 includes a login user name input box Bx10, a login password input box Bx12, an authentication destination specifying button B18, an OK button B20, and a cancel button B22.

The login user name input box Bx10 is an input box which accepts input of a login user name. A user attempting to log in to the multifunction peripheral 10 enters the login user name in the login user name input box Bx10. The login user name can also be selected from a separately established user name list.

The login password input box Bx12 is an input box that accepts the input of the login password corresponding to the login user name. The user attempting to log in to the multifunction peripheral 10 enters the login password along with the login user name.

The authentication destination specifying button B18 is a button that accepts a specified user authentication destination. The authentication destination may be the device per se, or it is possible to specify, for example, an authentication server separately established on the network. When authentication by a single device is specified as the authentication destination, the controller 11 authenticates the user by comparing the entered login user name and login password with authentication information prepared in advance (e.g., a combination of user name and password). Further, when using an authentication server or the like on the network, the controller 11 can also perform user authentication by transmitting the entered login user name and login password to the authentication server and receiving the authentication result from the authentication server. The user authentication can also be performed with the use of possession authentication using integrated circuit (IC) cards and terminal devices such as smartphones, or biometric authentication such as fingerprint or face recognition.

The OK button B20 accepts the input of an instruction to confirm the input operation by the user. The user presses the OK button B20 when confirming the input to the login user name input box Bx10 and the login password input box Bx12, and the specification of the authentication destination via the authentication destination specifying button B18. The cancel button B22 accepts cancellation instruction input of the input operation by the user.

Figure 9:
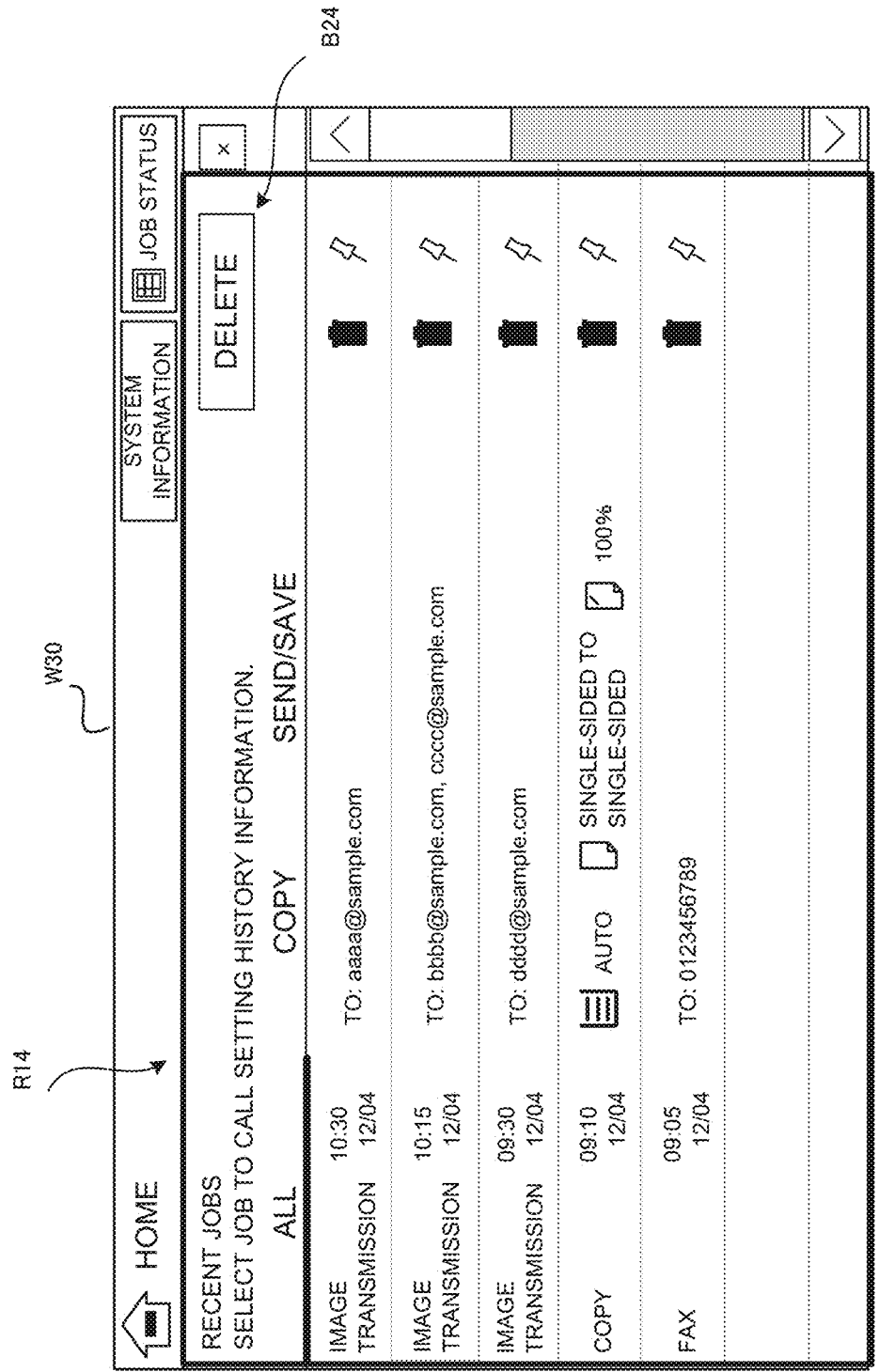
FIG. 9 is a diagram illustrating an operation example of the first embodiment.

FIG. 9 is a configuration example of a setting history display screen W30. The setting history display screen W30 can be displayed by pressing the setting history display button or the like (not illustrated) on the home screen (not illustrated) or the setting screen W10. By selecting desired setting history information via the setting history display screen W30, the user can reuse the settings of the job pertaining to that setting history information to execute the job.

The setting history display screen W30 includes a setting history display area R14 and a delete button B24. The setting history display area R14 is configured, for example, to allow the setting history information pertaining to each job to be displayed in chronological order. There is no limitation on the display format of the setting history information. For example, as illustrated in FIG. 9, it is possible to adopt a display mode such as displaying the setting history information pertaining to all jobs, displaying only the setting history information pertaining to a specific job, displaying only the setting history information pertaining to a login user's job, displaying only the setting history information with the same setting values, displaying only the setting history information pertaining to jobs executed within a specific period of time, and displaying only the setting history information pertaining to a specific job execution user.

FIG. 9 is an example in which the setting history information pertaining to five jobs of image transmission job, image transmission job, image transmission job, copy job, and fax job is displayed in chronological order from the top to the bottom. The setting history information illustrated in FIG. 9 corresponds to the setting history information pertaining to job ID "025" to "021" illustrated in FIG. 3.

In the setting history display area R14, there are no restrictions on the setting value items that each setting history information indicates. Due to the limited displayable area, there is a limit to the number of setting value items that can be displayed at one time, but the setting value items to be displayed can be selected as appropriate. Further, FIG. 9 illustrates pinning to fix each setting history information on the screen, but there is no need to make the pinning a mandatory display item.

Each of the setting history information displayed in the setting history display area R14 is configured so as to be selected by the user. By selecting the desired setting history information, the user can easily execute a job based on or similar to the setting history information.

The delete button B24 accepts an instruction to delete the setting history information from the setting history display area R14. When the delete button B24 is pressed by the user, the controller 11 cancels the display of the setting history information in the setting history display area R14.

Next, an example of operation when a job including security information such as personal information is executed and security information such as personal information is included in the generated setting history information will be described.

Figure 10:
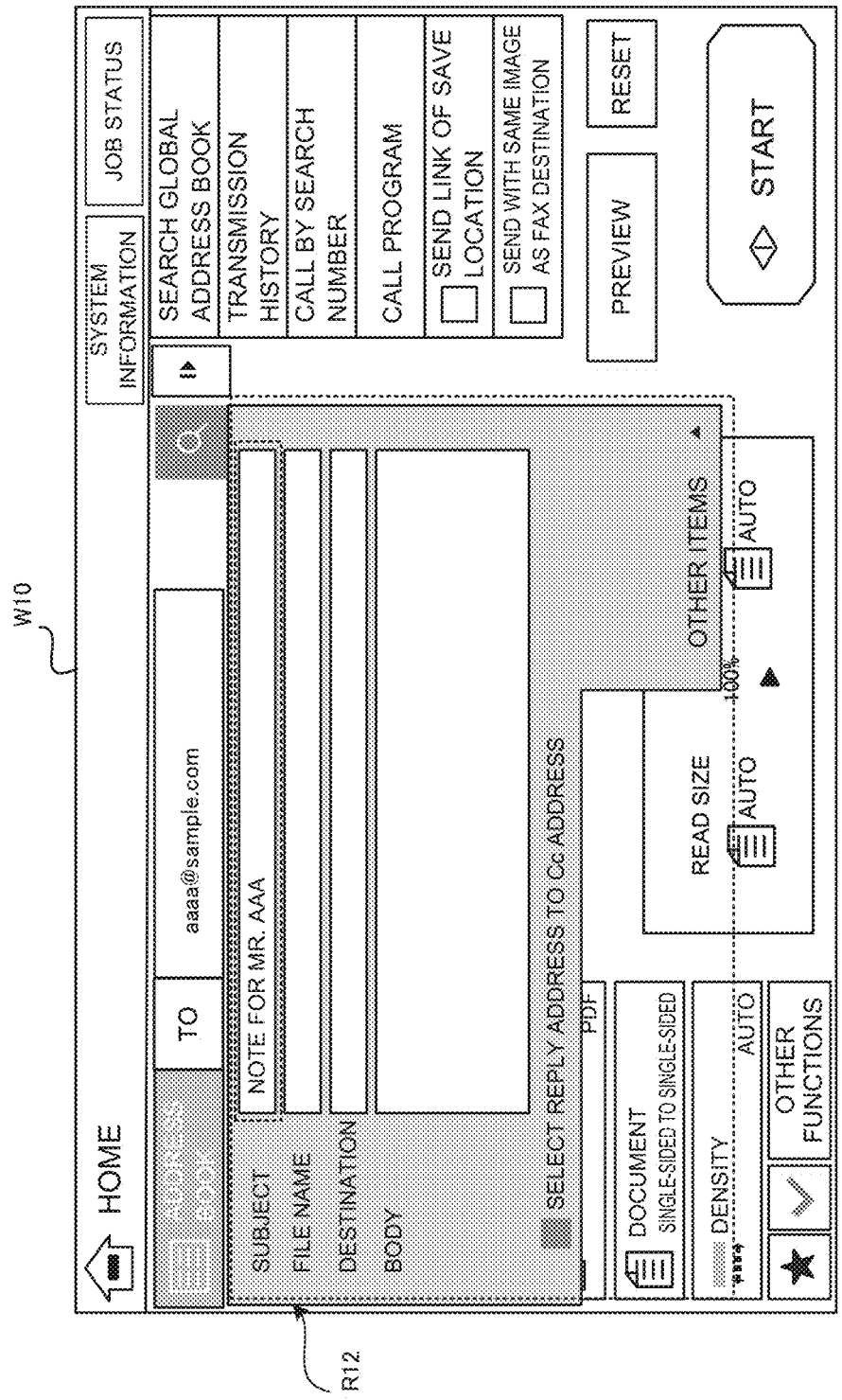
FIG. 10 is a diagram illustrating an operation example of the first embodiment.

As illustrated in FIG. 10, for example, when the subject in the subject and others display area R12 includes security information such as personal information (e.g., "Mr. AAA"), the controller 11 executes the image transmission job for the specified destination (aaaa@sample.com), and then generates setting history information including the personal information as a setting value. The controller 11 stores the generated setting history information in the setting history information storage area 236. FIG. 10 is an example of the setting screen W10 when generating the setting history information pertaining to the job ID "025" in FIG. 3.

Figure 11:
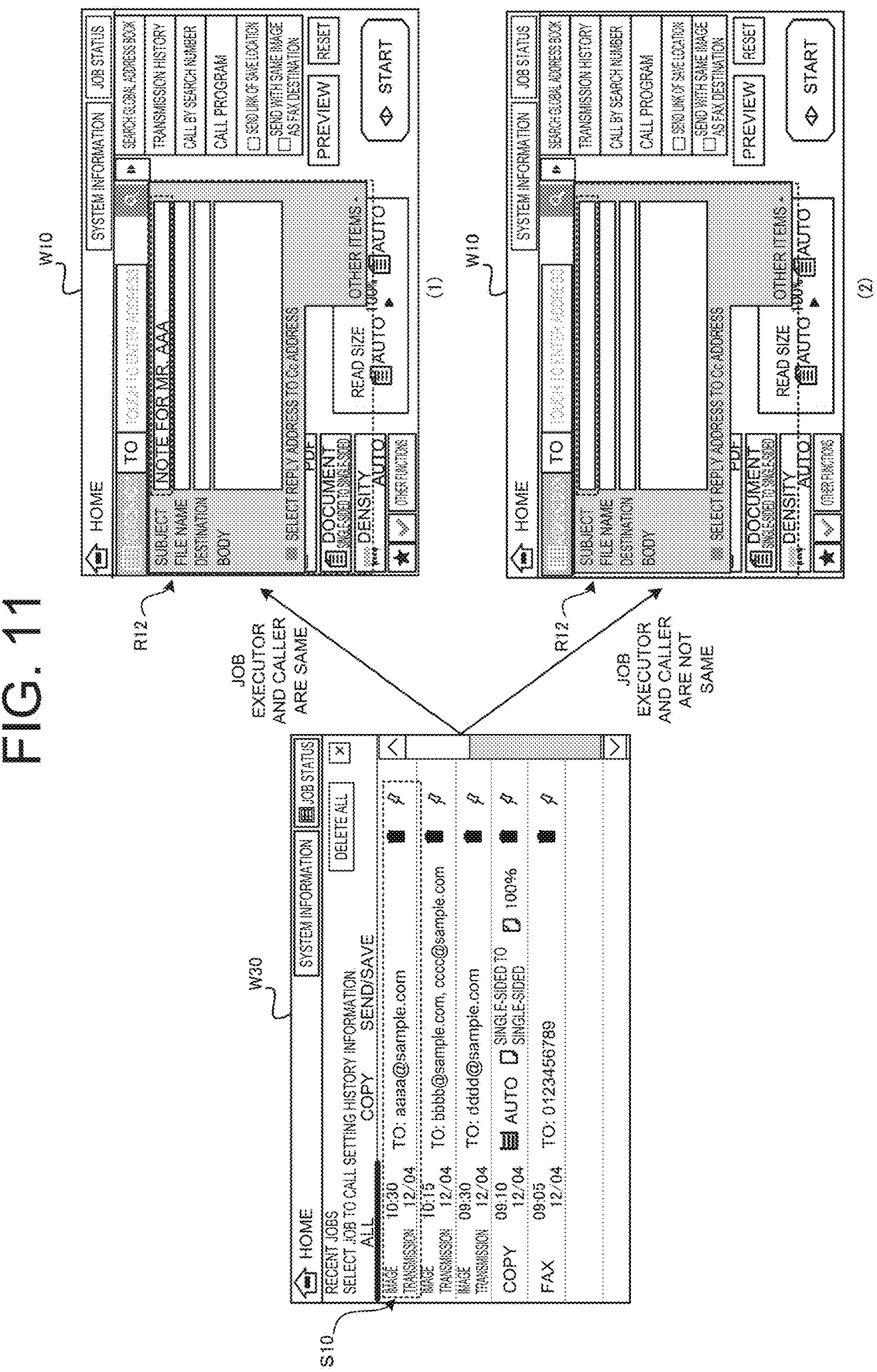
FIG. 11 is a diagram illustrating an operation example of the first embodiment.

FIG. 11 is a diagram illustrating the display control of restricted information that the controller 11 performs when the user selects setting history information S10 that includes personal information in the subject.

Figure 6:
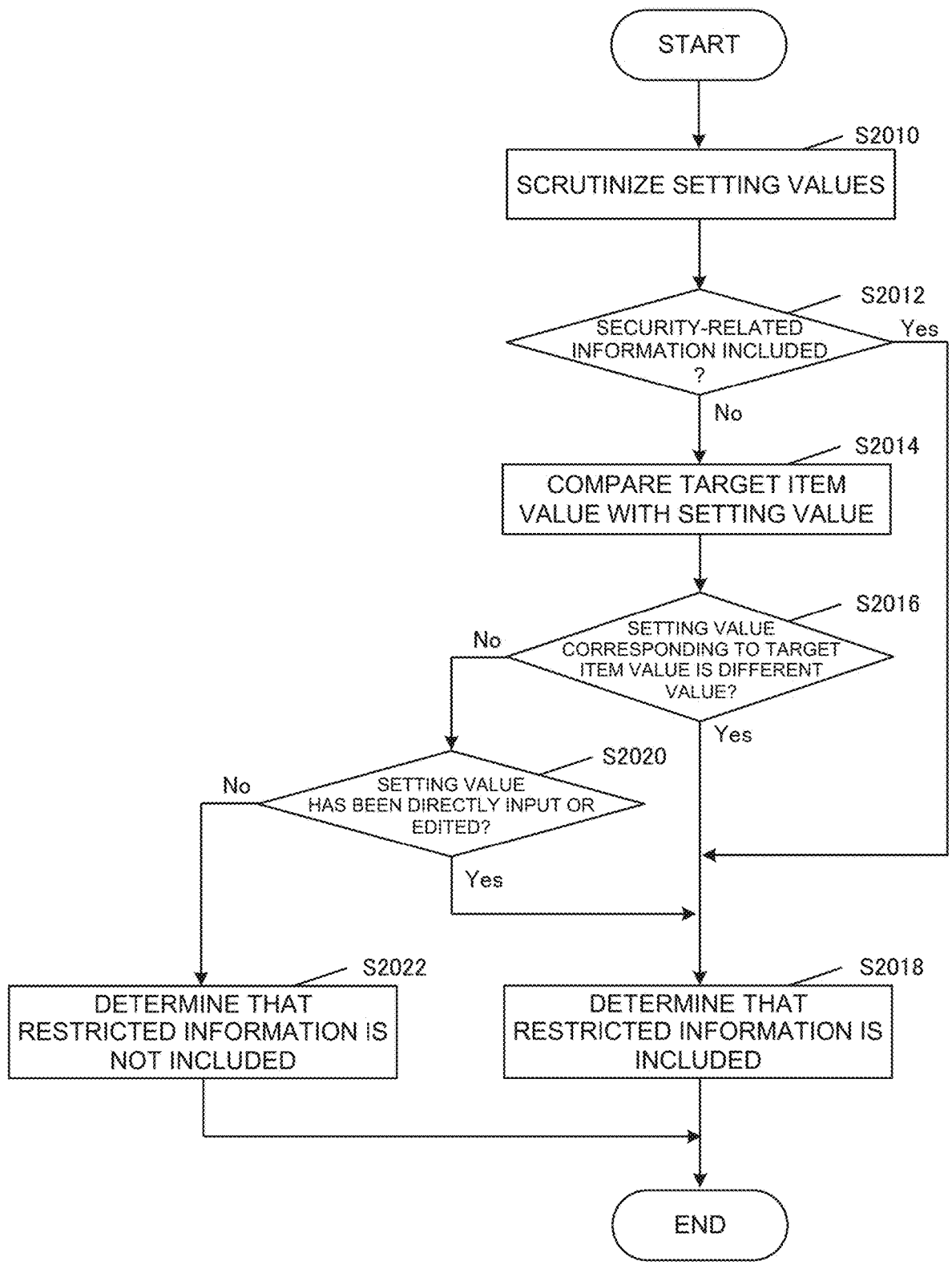
FIG. 6 is a flowchart illustrating a processing flow according to the first embodiment.

When the user selects the setting history information S10 via the setting history display screen W30, the controller 11 executes the processing according to steps S20 to S60 in FIG. 5 and the processing according to FIG. 6. As described with reference to FIG. 10, the setting history information S10 is an example of setting history information that includes personal information in the subject (see FIG. 3). Therefore, the controller 11 determines that the setting history information S10 includes restricted information. Next, the controller 11 determines whether the executor of the job pertaining to the setting history information and the caller of the setting history information are the same.

If the executor of the job pertaining to the setting history information and the caller of the setting history information are the same, the controller 11 displays the subject part as the restricted information without restriction, as illustrated in (1) of FIG. 11. That is, the controller 11 displays the setting history information as it is. On the other hand, if the executor of the job pertaining to the setting history information and the caller of the setting history information are not the same, the controller 11 restricts the display of the subject part as the restricted information, as illustrated in (2) of FIG. 11 (FIG. 11 is an example when the restricted information is hidden).

Next, an example of operation when the setting value (body) corresponding to the target item value of the setting history information is directly input or edited by the user will be described.

Figure 12:
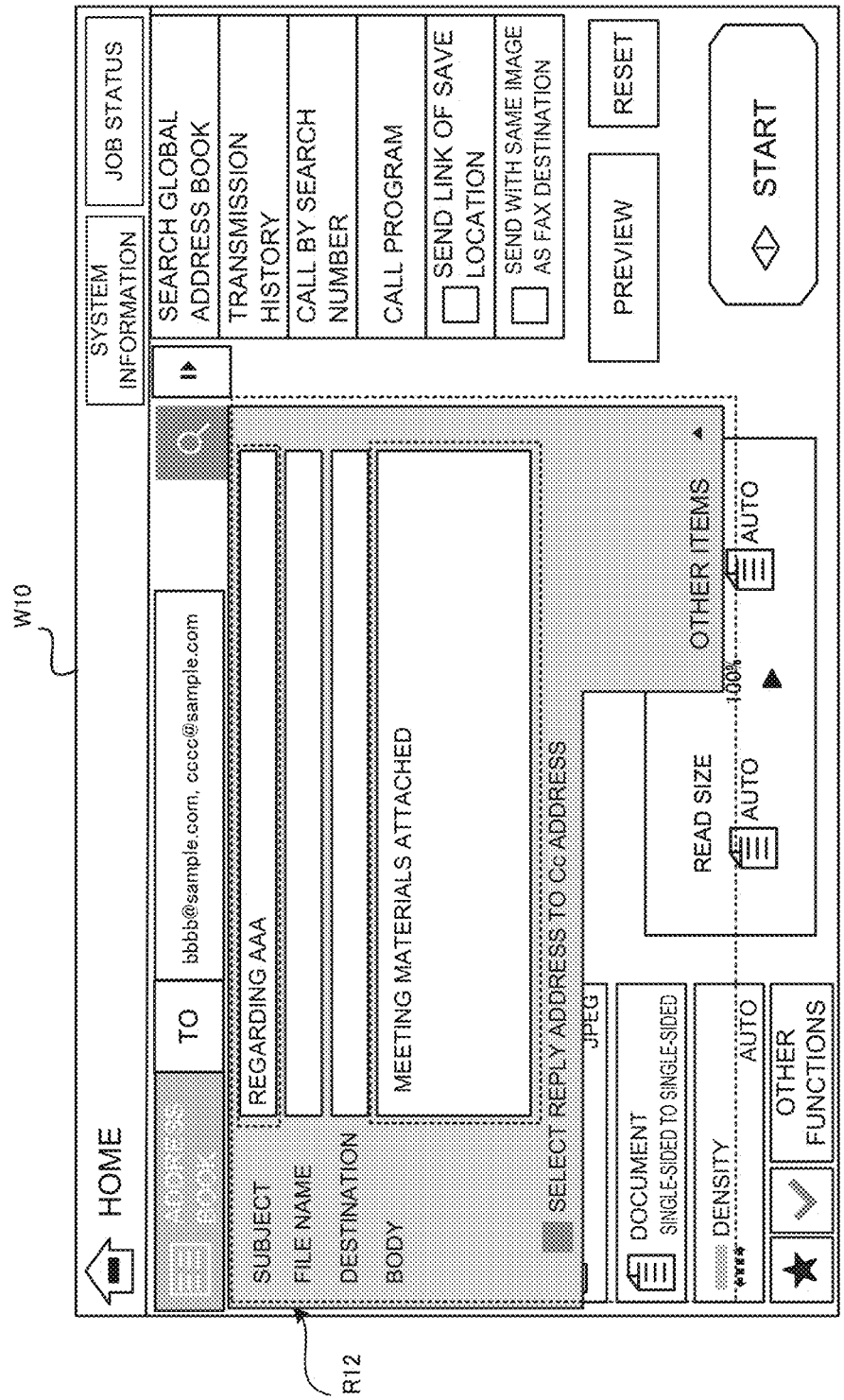
FIG. 12 is a diagram illustrating an operation example of the first embodiment.

As illustrated in FIG. 12, when the setting values corresponding to the target item values (subject: "Regarding AAA" and body: "Meeting materials attached") are included, the controller 11 executes the image transmission job for the specified destinations (bbbb@sample.com, cccc@sample.com), and then generates the setting history information including the setting values. The controller 11 stores the generated setting history information in the setting history information storage area 236. FIG. 12 is an example of the setting screen W10 when generating the setting history information corresponding to the job ID "024" in FIG. 3.

Figure 13:
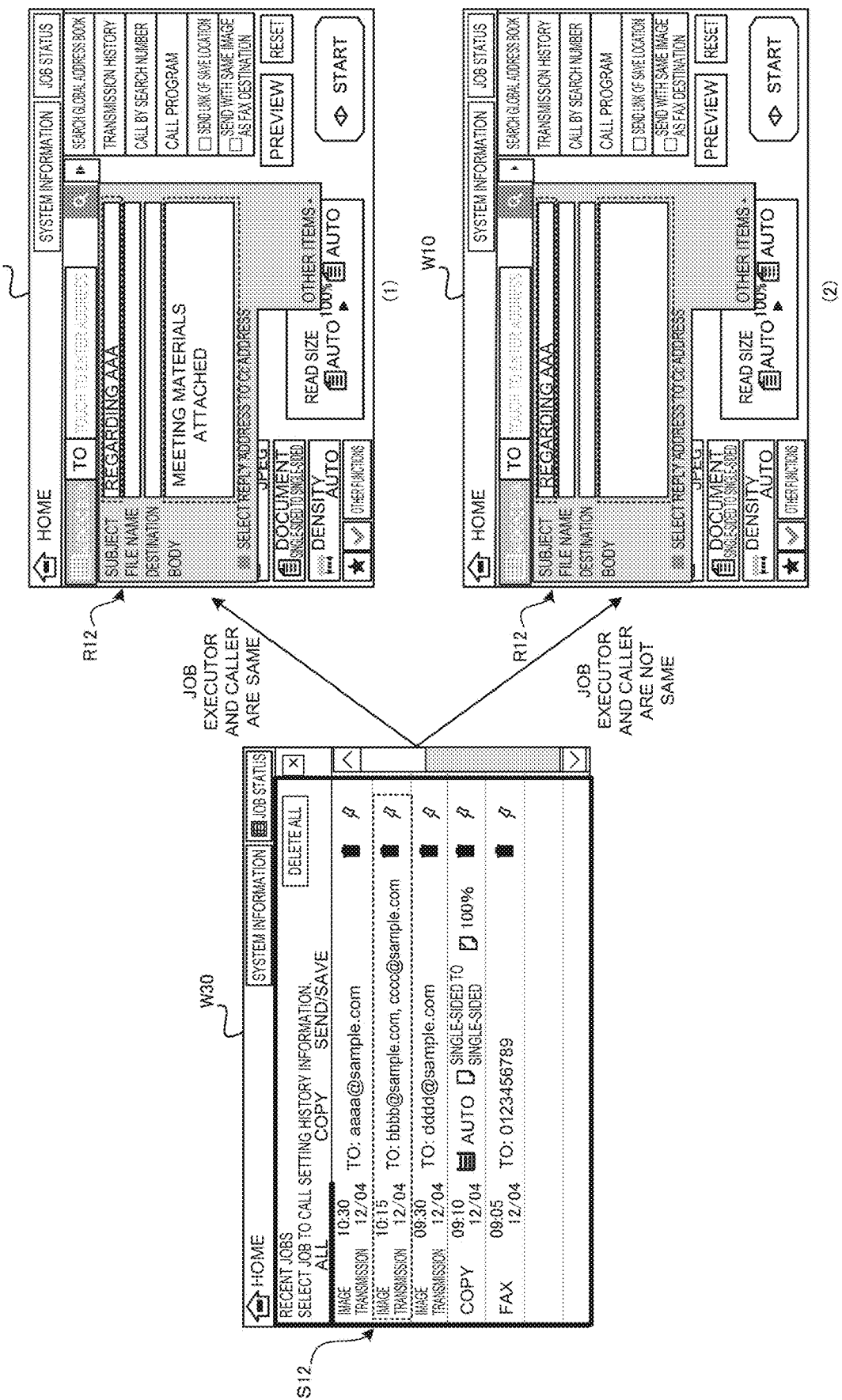
FIG. 13 is a diagram illustrating an operation example of the first embodiment.

FIG. 13 is a diagram illustrating the display control of restricted information that the controller 11 performs when the user selects setting history information S12 that includes the setting values (subject: "Regarding AAA" and body: "Meeting materials attached").

When the user selects the setting history information S12 via the setting history display screen W30, the controller 11 executes the processing according to steps S20 to S60 in FIG. 5 and the processing according to FIG. 6. As described with reference to FIG. 12, the setting history information S12 is an example of setting history information that includes the setting value corresponding to the target item value (body: "Meeting materials attached") and that has been directly input by the user (see FIG. 3). Therefore, the controller 11 determines that the setting history information S12 includes restricted information. Next, the controller 11 determines whether the executor of the job pertaining to the setting history information and the caller of the setting history information are the same.

If the executor of the job pertaining to the setting history information and the caller of the setting history information are the same, the controller 11 displays the body part as the restricted information without restriction, as illustrated in (1) of FIG. 13. That is, the controller 11 displays the setting history information as it is. On the other hand, if the executor of the job pertaining to the setting history information and the caller of the setting history information are not the same, the controller 11 restricts the display of the body part as the restricted information, as illustrated in (2) of FIG. 13 (FIG. 13 is an example when the restricted information is hidden). As for the subject part, the subject is the default_1 subject with the content of "Regarding AAA", and thus the controller 11 does not control the display of the subject part.

Next, an example of operation when the setting values (subject and file name) corresponding to the target item values of the setting history information are not directly input or not edited by the user will be described.

Figure 14:
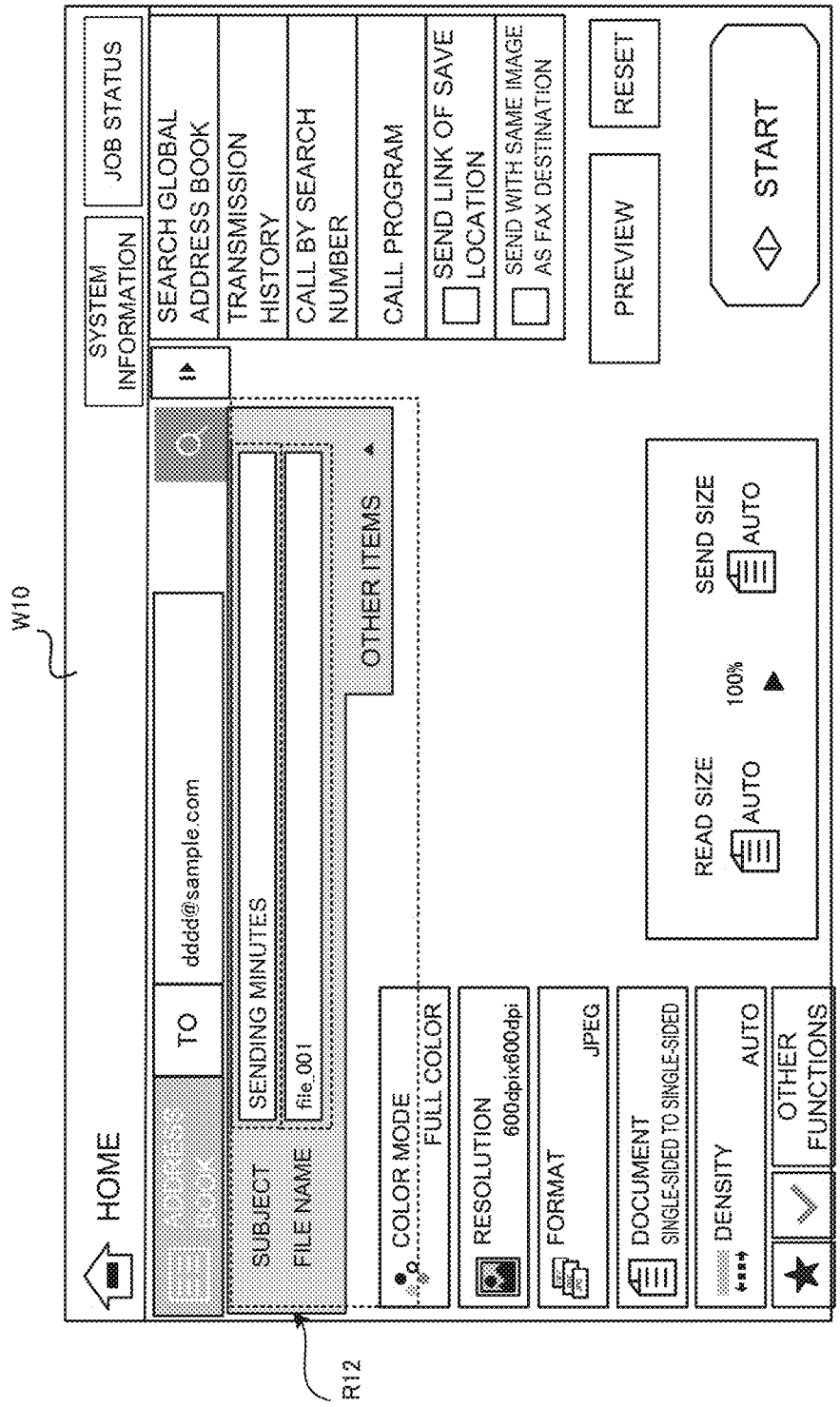
FIG. 14 is a diagram illustrating an operation example of the first embodiment.

As illustrated in FIG. 14, when the setting values corresponding to the target item values (subject: "Sending Minutes", file name: "file_001") are included, the controller 11 executes the image transmission job for the specified destination (dddd@sample.com), and then generates the setting history information including the setting values. The controller 11 stores the generated setting history information in the setting history information storage area 236. FIG. 14 is an example of the setting screen W10 when generating the setting history information corresponding to the job ID "023" in FIG. 3.

Figure 15:
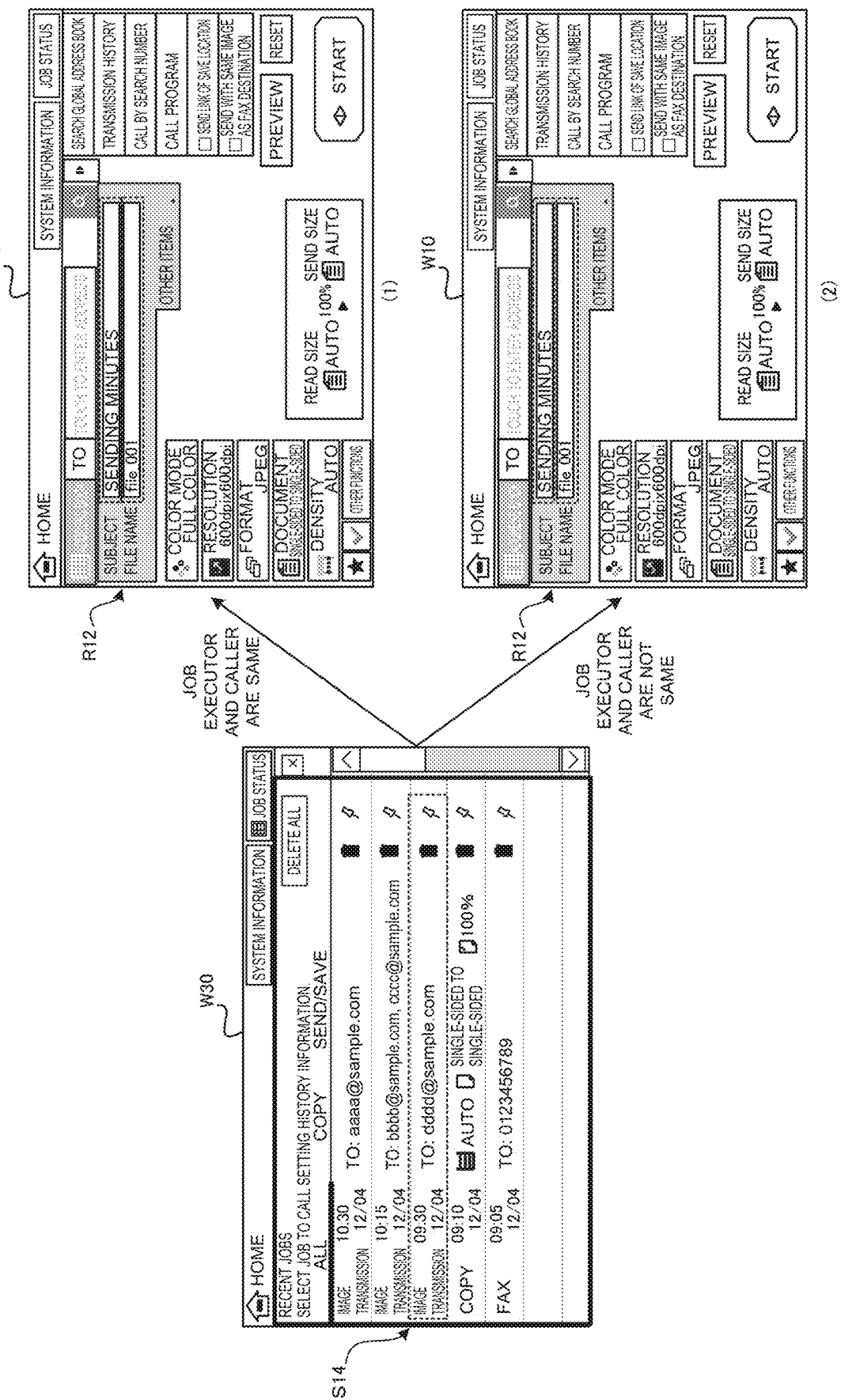
FIG. 15 is a diagram illustrating an operation example of the first embodiment.

FIG. 15 is a diagram illustrating the display control of restricted information that the controller 11 performs when the user selects setting history information S14 that includes the setting values (subject: "Sending Minutes", file name: "file_001").

When the user selects the setting history information S14 via the setting history display screen W30, the controller 11 executes the processing according to steps S20 to S60 in FIG. 5 and the processing according to FIG. 6. As described with reference to FIG. 14, the setting history information S14 is an example of setting history information that includes the setting values corresponding to the target item values (subject: "Sending Minutes", file name: "file_001"), but that is not directly input or edited by the user (see FIG. 3). Therefore, the controller 11 determines that the setting history information S14 does not include restricted information. Next, the controller 11 determines whether the executor of the job pertaining to the setting history information and the caller of the setting history information are the same.

However, since the controller 11 determines that the setting history information S14 does not include restricted information, the controller 11 displays the subject part and the file name as restricted information without restriction regardless of whether the executor of the job pertaining to the setting history information and the caller of the setting history information are the same. That is, the controller 11 displays the setting history information as it is (FIGS. 15(1) and 15(2)).

As described above, according to the first embodiment, when setting history information is read, the display of restricted information can be restricted if the setting history information includes the restricted information. In addition, when the executor of the job pertaining to the setting history information and the caller of the setting history information are not the same, the display of the restricted information is restricted. Thus, it is possible to provide an information processing apparatus or the like that can achieve high security while maintaining the convenience of reusing the setting history information pertaining to the execution of a new job.

2 Second Embodiment

A second embodiment is an embodiment in which the display of the setting history information including, as restricted information (setting value), attached information such as stamps such as "top secret" and "confidential" and watermarks attached to a printed matter output by the copy job and image data transmitted by the image transmission job is controlled. The second embodiment achieves a high level of security by controlling the display of setting values such that the operation of the executed job can be conceived of from the setting history information.

2.1 Functional Configuration

The functional configuration according to the second embodiment may be the same as that of the multifunction peripheral 10 according to the first embodiment. Therefore, the description of the functional configuration of the multifunction peripheral according to the second embodiment is omitted, and the same sign as that of the multifunction peripheral 10 according to the first embodiment is used for the description.

The setting history information according to the second embodiment will be described using FIG. 3 again. The setting history information pertaining to the job ID "022" in FIG. 3 is an example including stamp attached information as restricted information (setting value). The setting history information pertaining to job ID "022" includes, as information about the execution history, a job type "copy", an execution user name "User4", a start date and time-end date and time "2019/12/04 09:10:10-2019/12/04 09:10:50, a mode "normal".

The setting history information pertaining to the job ID "022" includes the setting value of stamp "type_1" as restricted information, in addition to the device setting values such as color mode "full color", document "automatic", paper selection "No. 1", double-sided copy "single-sided to single-sided", magnification "100%", and density "automatic".

Figures 16, 17:
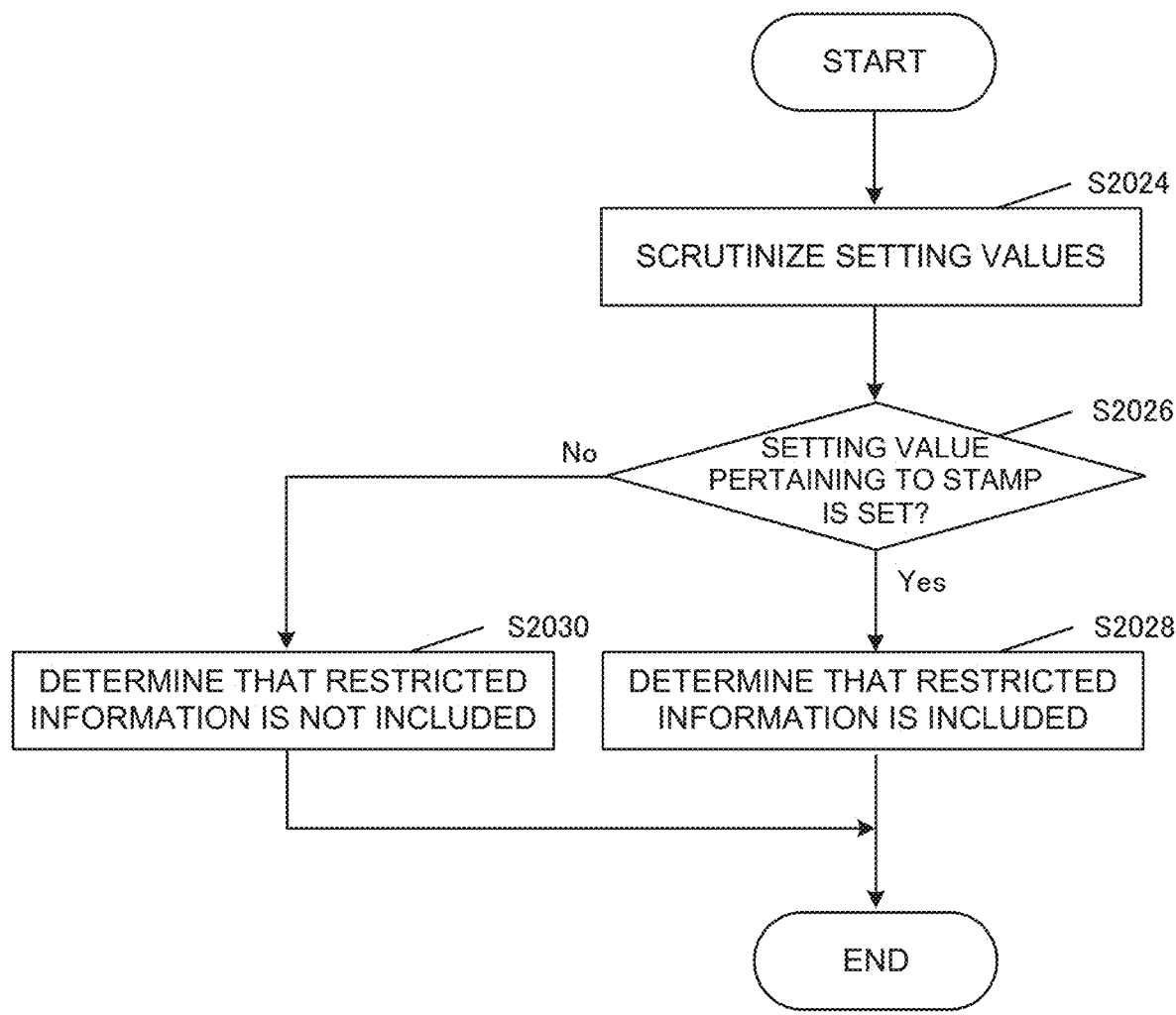
FIG. 16 is a table illustrating an example of a configuration of a stamp.
FIG. 17 is a flowchart illustrating a processing flow according to a second embodiment.

FIG. 16 is a table illustrating an example of specific content of stamp setting values (type_1 to type_3). The stamp illustrated in the second embodiment includes setting values for handling confidential documents such as type_1 (Top Secret), type_2 (Copy Strictly Prohibited), and type_3 (Confidential). For example, if a printed matter or image data is output or transmitted with a "Top Secret" stamp, the setting history information records "type_1" as the stamp setting value. The stamp setting values described with reference to FIG. 16 are examples only, and the stamp and watermark setting values according to the present disclosure are not limited by the descriptions in FIG. 16.

2.2 Processing Flow

Next, a processing flow according to the second embodiment will be described. The processing according to the second embodiment can be implemented in the same way as the processing described in the first embodiment, except for step S20 in FIG. 5. The processing according to step S20 in FIG. 5 will be described with the use of the flowchart of FIG. 17.

When starting to analyze the setting history information, the controller 11 scrutinizes the setting values included in the setting history information (step S2024). The controller 11 determines whether the setting value pertaining to a stamp is set (step S2026). When determining that the setting value pertaining to a stamp is set, the controller 11 determines that the setting history information includes restricted information, and ends the processing (if Yes in step S2026, then step S2028). On the other hand, when determining that the setting value pertaining to a stamp is not set, the controller 11 determines that the setting history information does not include restricted information, and ends the processing (if No in step S2026, then step S2030).

2.3 Operation Example

Figure 18:
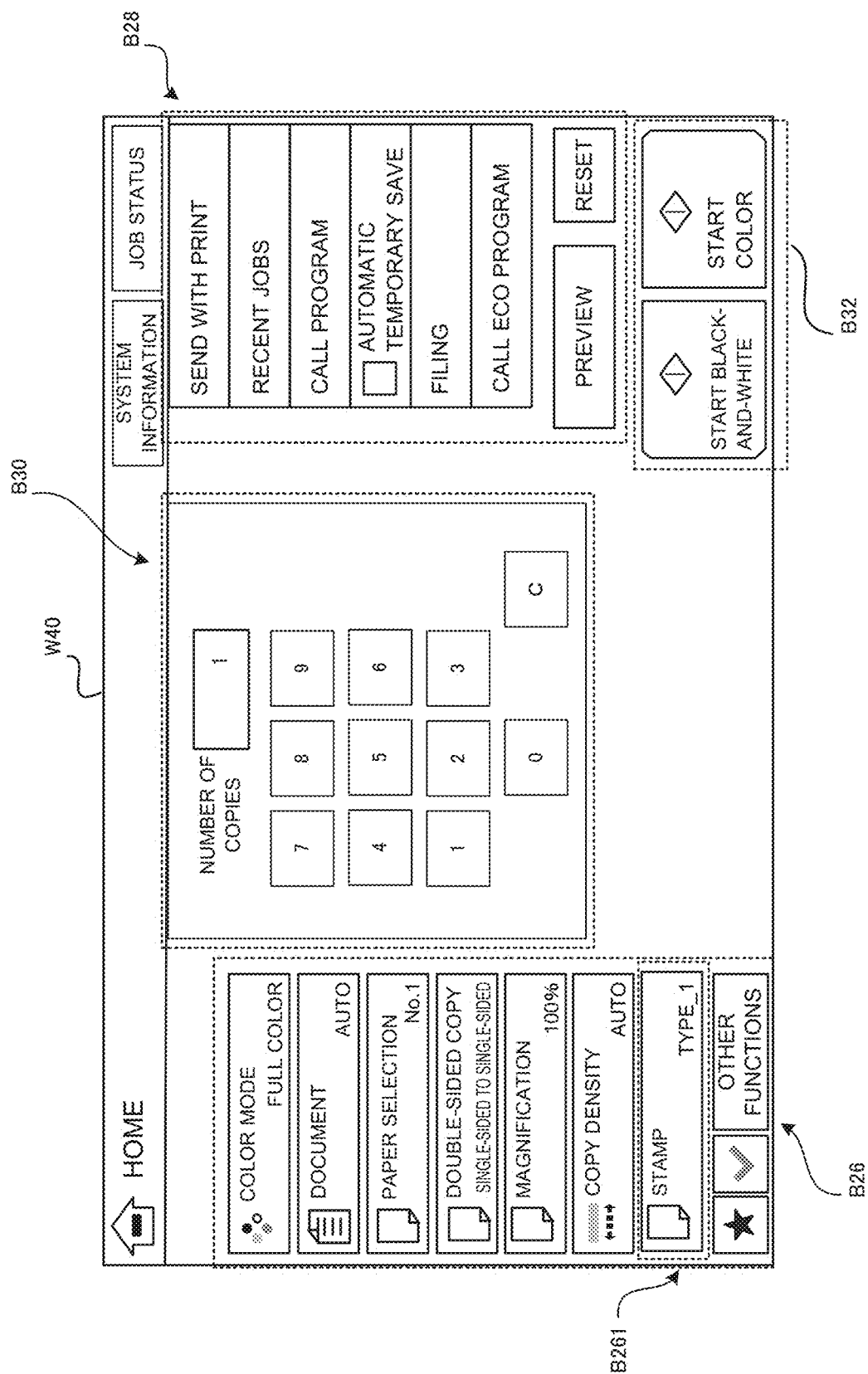
FIG. 18 is a diagram illustrating an operation example of the second embodiment.

Next, an operation example of the second embodiment will be described. FIG. 18 is a configuration example of a setting screen W40 pertaining to the copy job. The setting screen W40 can be displayed in mode selection processing or the like via a home screen (not illustrated). The setting screen W40 is a screen that accepts the selection and input of setting values pertaining to copy.

The setting screen W40 includes setting value buttons B26, operation control buttons B28, number of copies setting buttons B30, and start buttons B32.

The setting value buttons B26 accept the selection and input of setting values by the user. The user can, for example, press the color mode button and select desired a setting value from items such as "full color", "black and white", "monochromatic color", and "automatic (color/black and white)" pertaining to color mode selection, thereby setting the setting value pertaining to the color mode. FIG. 18 is an example in which seven types of setting value items of color mode, document, paper selection, double-sided copy, magnification, copy density, and stamp, are provided as setting value items that can be set.

The stamp button B261 provided on the setting value buttons B26 accepts a press when a stamp is applied to a printed matter that is the output result of a copy job. The user can select the setting value pertaining to the stamp by pressing the stamp button B261 and selecting a desired setting value from items pertaining to stamp selection, such as "type_1", "type_2", "type_3", and "No stamp" (not illustrated).

For each setting value indicated on the surface of the setting value buttons B26, the setting value of the applied setting history information is reflected and displayed (FIG. 18 is an example in which the setting value pertaining to the setting history information of the job ID "022" in FIG. 3 has been applied). The configuration of the setting value buttons B26 illustrated in FIG. 18 is only an example, and is not limited to the description in FIG. 18.

In addition to the above setting value items, the setting value buttons B26 are provided with an "Other Function" button. The user can call up and set other setting value items other than those displayed on the setting value buttons B26 by pressing the "Other Function" button.

In addition to the "Preview" and "Reset" buttons, the operation control buttons B28 include a "Send with Print" button, a "Recent Job" button, a "Call Program" button, an "Automatic Temporary Save" button, "Filing", "Call Eco Program", and the like. For example, the user can transmit the same image as the printed image to a given destination while executing a copy job by pressing the "Send with Print" button.

The number of copies setting buttons B30 include an input box for numerical input and accept input of the number of copies.

The start buttons B32 include a black-and-white start button and a color start button. If black-and-white copying is desired, the user presses the black-and-white start button. Meanwhile, if color copying is desired, the user presses the color start button. When either the black-and-white start button or the color start button is pressed by the user, the processing pertaining to the copy job is executed.

Next, an example of operation when the setting history information includes attached information such as a stamp as the restricted information (setting value) will be described.

As illustrated in FIG. 18, for example, when a setting value of type_1 is set as a stamp, the controller 11 executes the copy job, and then generates the setting history information including the setting value of the stamp. The controller 11 stores the generated setting history information in the setting history information storage area 236. FIG. 18 is an example of the setting screen W40 when generating the setting history information pertaining to the job ID "022" in FIG. 3.

Figure 19:
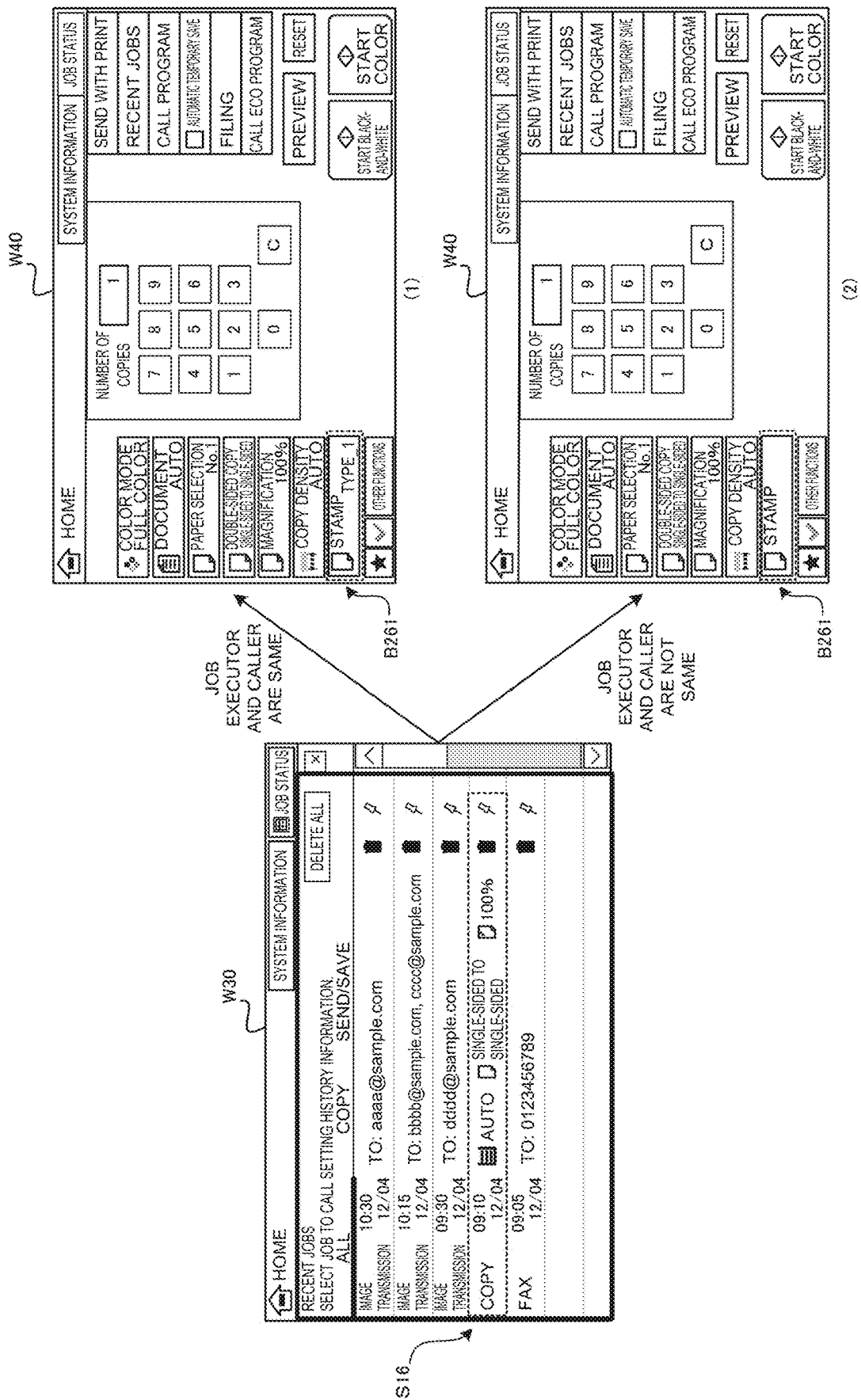
FIG. 19 is a diagram illustrating an operation example of the second embodiment.

FIG. 19 is a diagram illustrating the display control of restricted information that the controller 11 performs when the user selects setting history information S16 that includes the setting value of a stamp.

When the user selects the setting history information S16 via the setting history display screen W30, the controller 11 executes the processing according to steps S20 to S60 in FIG. 5 and the processing according to FIG. 17. As described with reference to FIG. 18, the setting history information S16 is an example of setting history information that includes the setting value of a stamp (see FIG. 3). Therefore, the controller 11 determines that the setting history information S16 includes restricted information. Next, the controller 11 determines whether the executor of the job pertaining to the setting history information and the caller of the setting history information are the same.

If the executor of the job pertaining to the setting history information and the caller of the setting history information are the same, the controller 11 displays the setting value of the stamp as the restricted information on the surface of the stamp button B261 without restriction, as illustrated in (1) of FIG. 19. That is, the controller 11 displays the setting history information as it is. On the other hand, if the executor of the job pertaining to the setting history information and the caller of the setting history information are not the same, the controller 11 restricts the display of the setting value of the stamp as the restricted information, as illustrated in (2) of FIG. 19 (FIG. 19 is an example when the restricted information is hidden). It is also possible to configure so as to unconditionally restrict the display of the portion pertaining to the restricted information when the user authentication is disabled, or to unconditionally restrict the display of the portion pertaining to the restricted information, regardless of the identity of the job executor pertaining to the setting history information and the caller of the setting history information.

As described above, according to the second embodiment, when setting history information is read, the display of restricted information can be restricted if the setting history information includes the restricted information. In addition, when the executor of the job pertaining to the setting history information and the caller of the setting history information are not the same, it is possible to restrict the display of the restricted information. Thus, it is possible to achieve high security such as preventing an analogy that a highly confidential document has been handled while maintaining the convenience of reusing the setting history information pertaining to the execution of a new job.

3 Third Embodiment

A third embodiment achieves a high level of security by restricting the display of fax data and image data destinations in fax jobs and image transmission jobs.

3.1 Functional Configuration

The functional configuration according to the third embodiment may be the same as that of the multifunction peripheral 10 according to the first embodiment or the second embodiment. Therefore, the description of the functional configuration of the multifunction peripheral according to the third embodiment is omitted, and the same sign as that of the multifunction peripheral 10 according to the first embodiment is used for the description.

The setting history information according to the third embodiment will be described using FIG. 3 again. The setting history information for job ID "021" in FIG. 3 is an example that includes the setting values pertaining to the destination redisplay setting. The setting history information pertaining to the job ID "021" includes, as information about the execution history, a job type "fax", an execution user name "User5", a start date and time-end date and time "2019/12/04 09:05:00-2019/12/04 09:06:10, a mode "normal".

The setting history information pertaining to the job ID "021" includes the setting value of destination redisplay "Yes" as restricted information, in addition to the device setting values such as density "automatic", image quality "normal characters", mass document mode "No", thin paper reading "No", and thick paper reading "No".

3.2 Processing Flow

Next, the processing flow according to the third embodiment will be described. The processing according to the third embodiment can be implemented in the same way as the processing described in the first embodiment, except for step S20 in FIG. 5. The processing according to step S20 in FIG. 5 will be described with the use of the flowchart of FIG. 20.

When starting to analyze the setting history information, the controller 11 scrutinizes the setting values included in the setting history information (step S2032). The controller 11 determines whether the setting value pertaining to the destination redisplay is set (step S2034). When determining that the setting value pertaining to the destination redisplay is set, the controller 11 determines that the setting history information includes restricted information, and ends the processing (if Yes in step S2034, then step S2036). On the other hand, when determining that the setting value pertaining to the destination redisplay is not set, the controller 11 determines that the setting history information does not include restricted information, and ends the processing (if No in step S2034, then step S2038).

3.3 Operation Example

Figure 21:
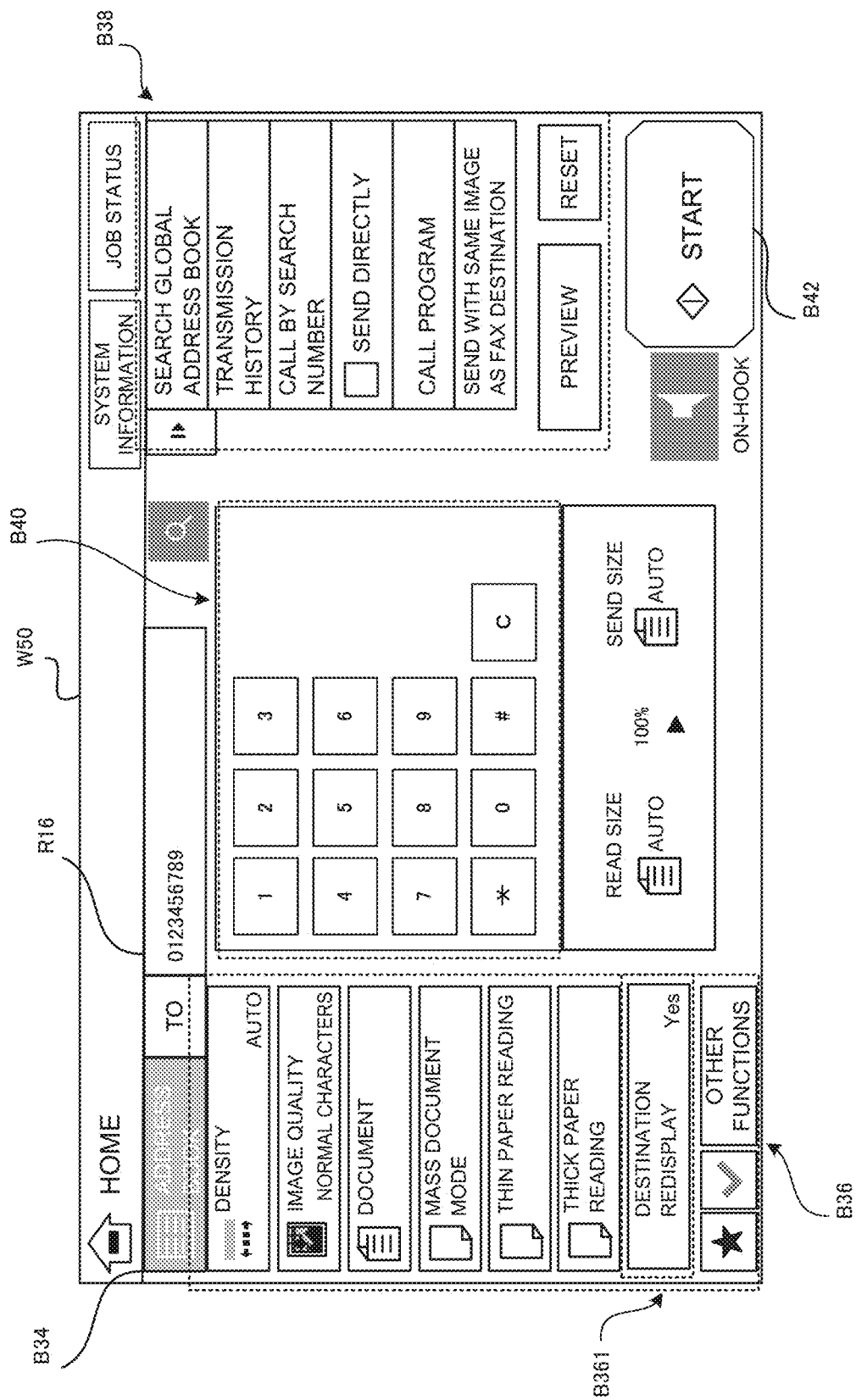
FIG. 21 is a diagram illustrating an operation example of the third embodiment.

Next, an operation example of the third embodiment will be described. FIG. 21 is a configuration example of a setting screen W50 pertaining to the fax job. The setting screen W50 can be displayed in mode selection processing or the like via a home screen (not illustrated). The setting screen W50 is a screen that accepts the selection and input of setting values pertaining to fax.

The setting screen W50 includes an address book button B34, setting value buttons B36, operation control buttons B38, fax number setting buttons B40, a start button B42, and a destination display area R16.

The address book button B34 accepts a press when specifying a destination as the destination of the fax data. When the address book button B34 is pressed, the controller 11 displays the address book (not illustrated). In this case, the controller 11 can display the address book managed inside the multifunction peripheral 10, or can display the address book acquired from an external terminal device, for example. The user can specify the destination of the fax data by selecting a desired address (fax number, etc.) from the displayed address book. The controller 11 displays the specified address in the destination display area R16.

The setting value buttons B36 accept the selection and input of setting values by the user. The user can, for example, press the density button and select a desired setting value from items such as "dark", "normal", "light", and "automatic" pertaining to density selection, thereby setting the setting value pertaining to the density. FIG. 21 is an example in which seven types of setting value items of "density", "image quality", "document", "mass document mode", "thin paper reading", "thick paper reading", and "destination redisplay" are provided as setting value items that can be set.

A destination redisplay button B361 provided on the setting value buttons B36 accepts a press when redisplay setting of a fax data destination is performed. The user can select the setting value pertaining to the destination redisplay by pressing the destination redisplay button B361 and selecting a desired setting value from items pertaining to destination redisplay selection, such as "Yes" or "No" (not illustrated).

For each setting value indicated on the surface of the setting value buttons B36, the setting value of the applied setting history information is reflected and displayed (FIG. 21 is an example in which the setting value pertaining to the setting history information of the job ID "021" in FIG. 3 has been applied). The configuration of the setting value buttons B36 illustrated in FIG. 21 is only an example, and is not limited to the description in FIG. 21.

In addition to the above setting value items, the setting value buttons B36 are provided with an "Other Function" button. The user can call up and set other setting value items other than those displayed on the setting value buttons B36 by pressing the "Other Function" button.

In addition to the "Preview" and "Reset" buttons, the operation control buttons B38 include, for example, a "Search Global Address Book" button, a "Transmission History" button, a "Call by Search Number" button, a "Send Directly", "Call Program", a "Send with Same Image as Fax Destination" button, and the like. For example, a destination of fax transmission can be selected from the global address book by pressing the "Global Address Book" button.

The fax number setting buttons B40 include an input box for numerical input and accept input of a fax number.

The start button B42 accepts input of instructions for executing a fax job. When the start button B42 is pressed, the processing pertaining to the fax job is executed.

The destination display area R16 is a display area where the destination of the fax input by selecting an address from the aforementioned address book, selecting an address from the global address book, selecting an address from the transmission history, or by direct input, or the like is displayed as the destination.

Next, an example of operation when the setting history information includes the setting value pertaining to destination redisplay will be described.

As illustrated in FIG. 21, for example, when the setting value of destination redisplay is set via the pressing of the destination redisplay button B361, the controller 11 executes the fax job, and then generates the setting history information including the setting value of the destination redisplay. The controller 11 stores the generated setting history information in the setting history information storage area 236. FIG. 21 is an example of the setting screen W50 when generating the setting history information pertaining to the job ID "021" in FIG. 3.

Figure 22:
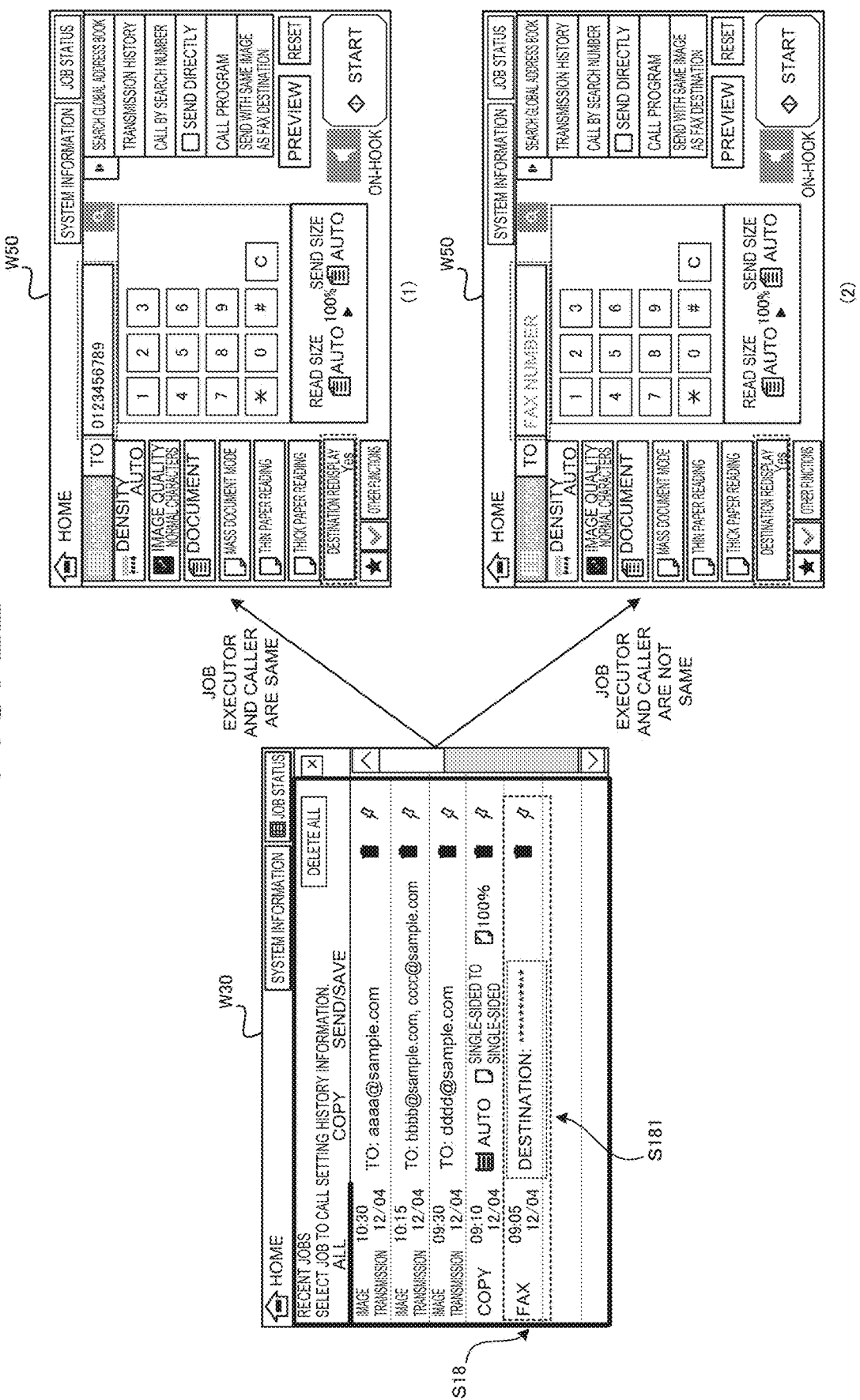
FIG. 22 is a diagram illustrating an operation example of the third embodiment.

FIG. 22 is a diagram illustrating the display control of restricted information that the controller 11 performs when the user selects setting history information S18 that includes the setting value of destination redisplay. When the user selects the setting history information S18, the destination S181 (destination for fax data transmission) included in the setting history information S18 is preferably hidden.

Figure 20:
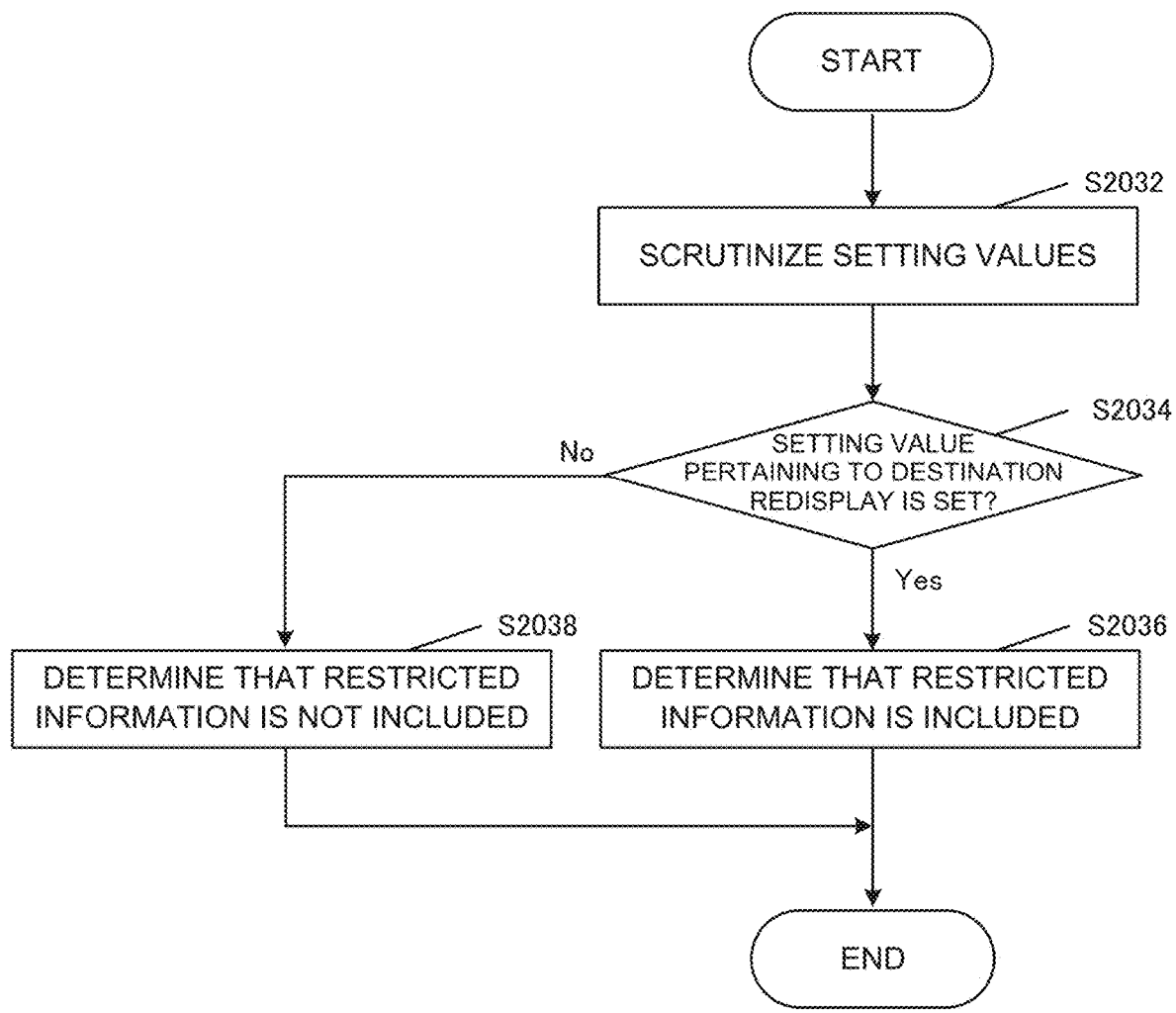
FIG. 20 is a flowchart illustrating a processing flow according to a third embodiment.

When the user selects the setting history information S18 via the setting history display screen W30, the controller 11 executes the processing according to steps S20 to S60 in FIG. 5 and the processing according to FIG. 20. As described with reference to FIG. 21, the setting history information S18 is an example of setting history information that includes the setting value ("Yes") of destination redisplay (see FIG. 3). Therefore, the controller 11 determines that the setting history information S18 includes restricted information. Next, the controller 11 determines whether the executor of the job pertaining to the setting history information and the caller of the setting history information are the same.

If the executor of the job pertaining to the setting history information and the caller of the setting history information are the same, the controller 11 displays the destination (fax number) in the destination display area R16 without restriction, as illustrated in (1) of FIG. 22. On the other hand, if the executor of the job pertaining to the setting history information and the caller of the setting history information are not the same, the controller 11 restricts the display of the destination (fax number) in the destination display area R16, as illustrated in (2) of FIG. 22 (FIG. 22 is an example when the restricted information is hidden).

As described above, according to the third embodiment, when setting history information is read, the display of restricted information can be restricted if the setting history information includes the restricted information. In addition, when the executor of the job pertaining to the setting history information and the caller of the setting history information are not the same, it is possible to restrict the display of the restricted information. Thus, it is possible to provide an information processing apparatus or the like that can achieve high security while maintaining the convenience of reusing the setting history information pertaining to the execution of a new job.

The present disclosure is not limited to the above-described embodiments, and various modifications may be made. That is, the technical scope of the present disclosure also includes embodiments that may be obtained by combining technical measures that are modified as appropriate without departing from the gist of the present disclosure.

Further, although some of the above embodiments are described separately for convenience of explanation, it is needless to say that they may be combined and implemented within a technically allowable range.

Further, the program to be operated on the individual devices of the embodiments is a program which controls the CPU or the like (program which makes a computer work) so as to implement the functions of the above-described embodiments. The information handled by these devices is temporarily accumulated in a temporary storage device (e.g., RAM) during the processing, is then stored in various storage devices such as a read only memory (ROM) and an HDD, and is read, corrected, and written by the CPU as needed.

Here, a recording medium storing the program may be any of a semiconductor medium (e.g., a ROM or a non-volatile memory card), an optical recording medium/magneto-optical recording medium (e.g., a digital versatile disc (DVD), a magneto optical disc (MO), a mini disc (MD), a compact disc (CD), and a Blu-ray Disc (BD) (registered trademark)), and a magnetic recording medium (e.g., a magnetic tape, and a flexible disk). Further, the functions according to the above-described embodiments are performed by executing the loaded program, and also the functions according to the present disclosure may be performed by processing in cooperation with an operating system, other application programs or the like, on the basis of the instruction of the program.

For market distribution, the program may be stored and distributed in a portable recording medium or transferred to a server computer connected via a network such as the Internet. In this case, it is needless to say that the present disclosure also includes a storage device of the server computer.

What is claimed is:

1. An information processing apparatus comprising:
a storage;
a display; and
one or more controllers,
wherein the storage stores history information pertaining to one or more job executions, the history information includes at least one of restricted information and non-restricted information, and
the one or more controllers display a history display screen including the history information on the display,
wherein the one or more controllers, when displaying a setting screen for accepting input of setting values pertaining to a job execution on the display based on a selection of the history information including the restricted information on the history display screen, are configured to:
cause the display not to restrict a display of the restricted information when an executor of a job pertaining to the history information including the restricted information and a caller of the history information including the restricted information are the same, and
cause the display to restrict the display of the restricted information when the executor of the job pertaining to the history information including the restricted information and the caller of the history information including the restricted information are not the same.

2. The information processing apparatus according to claim 1, wherein when a setting value of the restricted information does not include any of personal information, information that allows an operation of the job to be conceived from the history information, or destination information, the one or more controllers do not restrict the display of the restricted information.

3. The information processing apparatus according to claim 1, wherein the one or more controllers compare a setting value of the restricted information with a target item value registered in advance, and when the setting value of the restricted information is the same as the target item value, or when the setting value is not directly input by a user, or when the setting value is not edited by the user, the one or more controllers do not restrict the display of the restricted information.

4. The information processing apparatus according to claim 3, wherein when the job is a transmission job that transmits a file, the one or more controllers compare the target item value of at least one of a subject, a body, or a file name with the setting value.

5. The information processing apparatus according to claim 2, wherein the information that allows the operation of the job to be conceived comprises confidential information.

6. An information processing method comprising:
storing history information pertaining to one or more job executions in a storage device, wherein the history information comprises at least one of restricted information and non-restricted information; and
displaying a history display screen that includes the history information on a display,
wherein when displaying a setting screen for accepting input of setting values pertaining to a job execution on the display based on a selection of the history information including the restricted information on the history display screen, the method further comprises:
causing the display not to restrict a display of the restricted information when an executor of a job pertaining to the history information including the restricted information and a caller of the history information including the restricted information are the same; and
causing the display to restrict the display of the restricted information when the executor of the job pertaining to the history information including the restricted information and the caller of the history information including the restricted information are not the same.

* * * * *